(12) United States Patent
Nakashima

(10) Patent No.: US 8,820,449 B2
(45) Date of Patent: Sep. 2, 2014

(54) ELECTRIC VEHICLE

(75) Inventor: Masahiro Nakashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 13/425,785

(22) Filed: Mar. 21, 2012

(65) Prior Publication Data

US 2012/0248851 A1 Oct. 4, 2012

(30) Foreign Application Priority Data

Mar. 31, 2011 (JP) ................. 2011-081249

(51) Int. Cl.
*B62M 7/12* (2006.01)
*B60K 7/00* (2006.01)
*B60K 1/00* (2006.01)
*B62M 6/65* (2010.01)
*B60K 17/04* (2006.01)

(52) U.S. Cl.
CPC ............... *B62M 6/65* (2013.01); *B60K 17/043* (2013.01); *B62K 2204/00* (2013.01); *B60K 2007/0092* (2013.01); *B60W 2300/365* (2013.01); *B62M 7/12* (2013.01); *B60K 7/0007* (2013.01)
USPC ....... 180/65.51; 180/65.1; 180/220; 180/65.6

(58) Field of Classification Search
USPC ............. 180/65.1, 65.51, 65.21, 220; 301/6.5
See application file for complete search history.

(56) References Cited

U.S. PATENT DOCUMENTS

| | | | | |
|---|---|---|---|---|
| 3,704,759 A * | 12/1972 | Vitkov et al. | ............. | 180/65.51 |
| 3,892,300 A * | 7/1975 | Hapeman et al. | .......... | 180/65.51 |
| 4,648,487 A * | 3/1987 | Kimura | ........................... | 185/39 |
| 5,207,288 A * | 5/1993 | Ono | ............................. | 180/220 |
| 5,691,584 A * | 11/1997 | Toida et al. | ................. | 310/67 R |
| 5,755,304 A * | 5/1998 | Trigg et al. | ................. | 180/65.51 |
| 6,199,652 B1 * | 3/2001 | Mastroianni et al. | ......... | 180/229 |
| 6,378,642 B1 * | 4/2002 | Sutton | ........................ | 180/208 |
| 7,255,188 B2 * | 8/2007 | Tsukada et al. | ............. | 180/65.51 |
| 7,472,770 B2 * | 1/2009 | Tomoshige et al. | ........ | 180/65.51 |
| 7,530,416 B2 * | 5/2009 | Suzuki | ........................ | 180/65.51 |
| 7,950,484 B2 * | 5/2011 | Moriguchi et al. | ........ | 180/65.51 |
| 8,002,062 B2 * | 8/2011 | Saitou | ........................ | 180/68.3 |
| 8,413,748 B2 * | 4/2013 | Nishikawa et al. | ........ | 180/65.51 |
| 8,540,041 B2 * | 9/2013 | Su et al. | ..................... | 180/65.51 |
| 8,556,019 B2 * | 10/2013 | Kuroki | ........................ | 180/220 |
| 8,602,145 B2 * | 12/2013 | Su et al. | ..................... | 180/65.51 |
| 2006/0096793 A1 * | 5/2006 | Akagi et al. | ................ | 180/65.1 |
| 2010/0294576 A1 * | 11/2010 | Wargh et al. | ................. | 180/55 |
| 2011/0024206 A1 * | 2/2011 | Sagara et al. | ................ | 180/65.1 |
| 2011/0139523 A1 * | 6/2011 | Chen | ......................... | 180/65.51 |

(Continued)

FOREIGN PATENT DOCUMENTS

JP 53-136736 10/1978
JP 2008-100609 5/2008

*Primary Examiner* — J. Allen Shriver, II
*Assistant Examiner* — Travis Coolman
(74) *Attorney, Agent, or Firm* — Rankin, Hill & Clark LLP

(57) ABSTRACT

An electric vehicle includes an axle that is a hollow cylindrical shaft. A motor shaft is inserted into a hollow portion of the axle substantially coaxially with the axle. In this case, on one side of a wheel, a motor is connected to a base end of the motor shaft extending from one end of the axle. Also, on the other side of the wheel, a reduction mechanism is connected to a leading end of the motor shaft extending from the other end of the axle.

17 Claims, 13 Drawing Sheets

(56) References Cited

U.S. PATENT DOCUMENTS

| | | | |
|---|---|---|---|
| 2012/0161497 A1* | 6/2012 | He et al. | 301/6.5 |
| 2012/0244980 A1* | 9/2012 | Su et al. | 475/149 |
| 2012/0312608 A1* | 12/2012 | Baumgartner et al. | 180/62 |
| 2012/0318600 A1* | 12/2012 | Hakamata et al. | 180/220 |
| 2013/0277133 A1* | 10/2013 | Matsuda, Yoshimoto | 180/220 |

\* cited by examiner

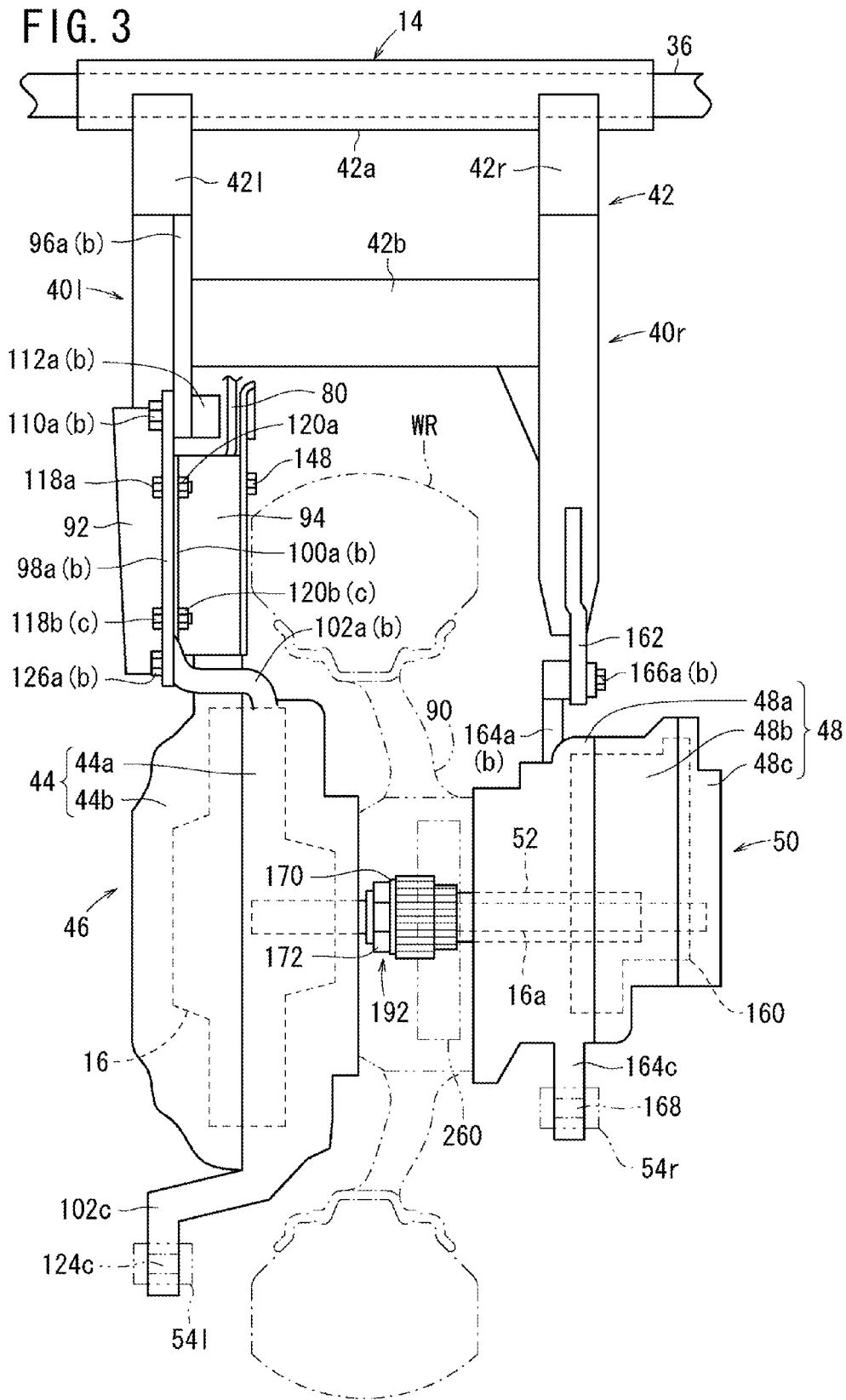

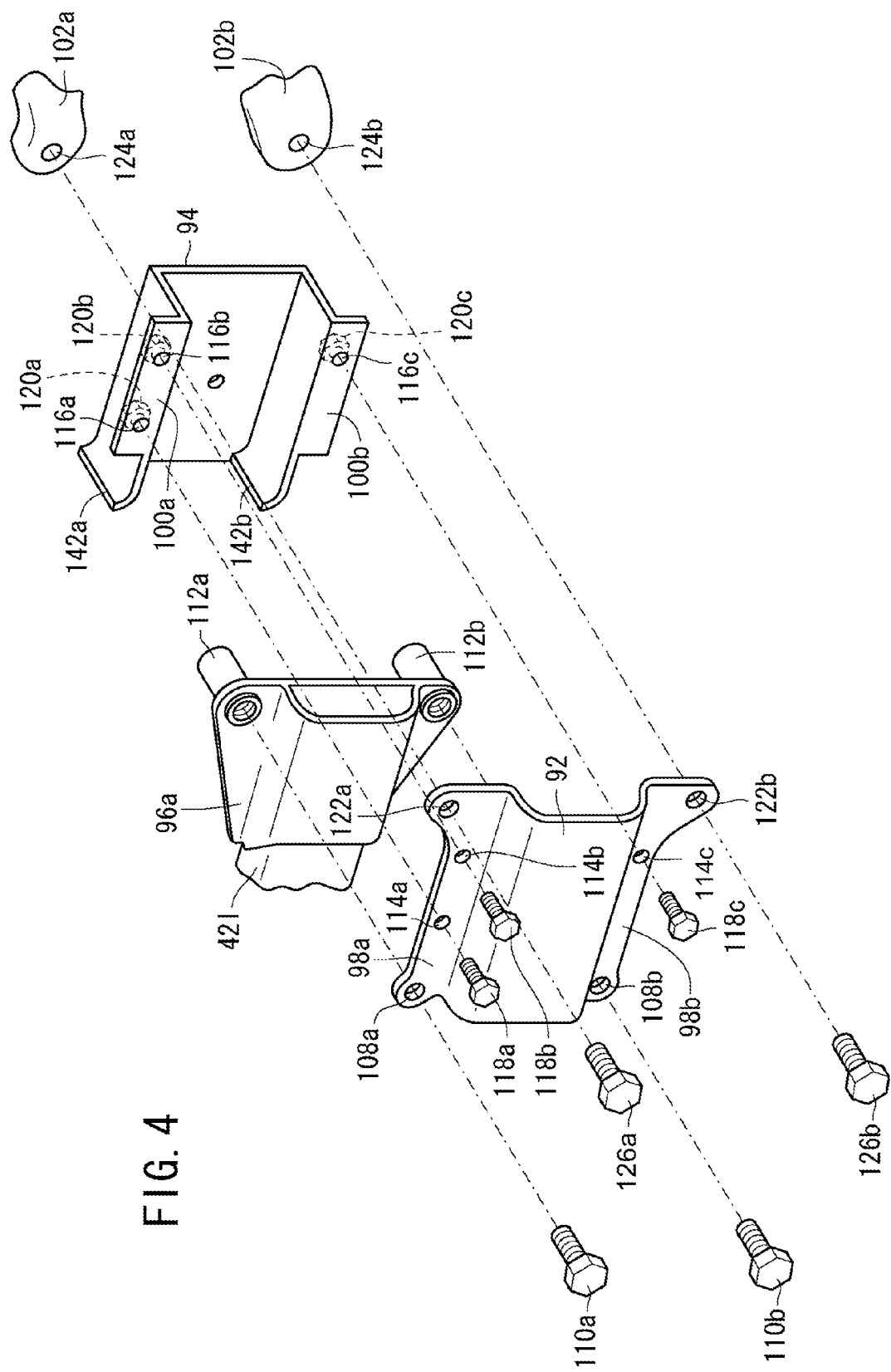

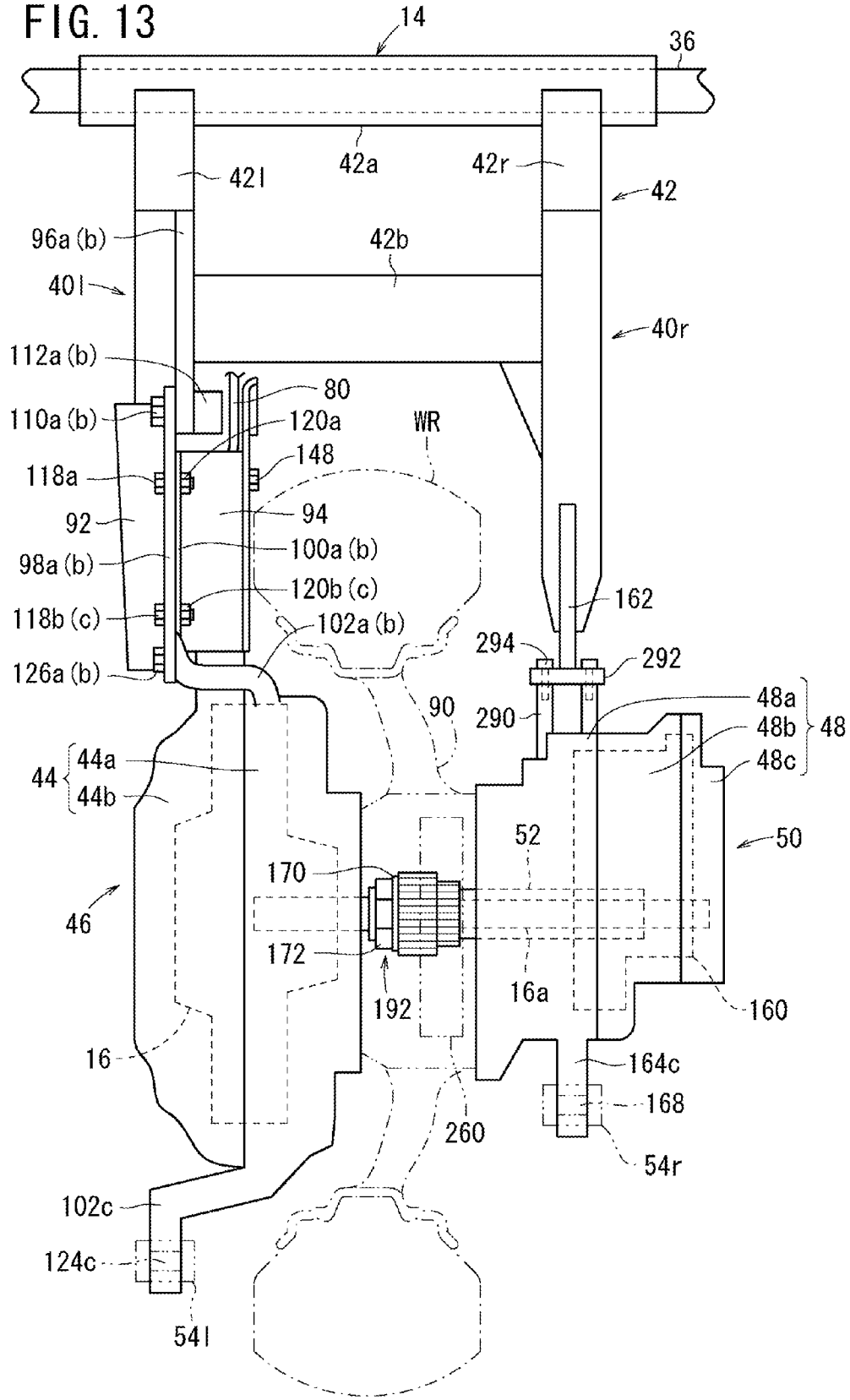

ELECTRIC VEHICLE

BACKGROUND OF THE INVENTION

1. Field of the Invention

The present invention relates to an electric vehicle in which an output of a motor is transmitted to an axle through a reduction mechanism, thereby rotating a wheel.

2. Description of the Prior Art

In the past, various electric vehicles have been proposed in which an output of a motor is transmitted to an axle through a reduction mechanism, thereby rotating a wheel.

For example, in JP-U No. S53-136736, there is proposed an in-wheel motor electric vehicle in which a motor and a brake are provided within a wheel, and the wheel and an axle are supported by a double-sided swing arm.

Also, in JP-A No. 2008-100609, there is proposed an electric vehicle in which, on one side of a wheel, a motor and a reduction mechanism are built into a swing arm, and a brake is provided within the wheel, while on the other side of the wheel, an axle passing through the wheel is supported by an auxiliary arm, thereby supporting the wheel and the axle with a double-sided swing arm.

In this manner, in each of the electric vehicles disclosed in above-mentioned documents, both sides of the wheel and axle are supported by the double-sided swing arm. However, a heavy object, such as the motor, is disposed on a side (one side) of the wheel, leading to an application of a heavy load to only one side of the wheel. Therefore, it is difficult to achieve weight balance. In addition, in JP-A No. 2008-100609, both the reduction mechanism and the brake are disposed on one side of the wheel. This makes it more difficult to achieve weight balance.

Also, because a drive system such as the motor is collectively provided on one side of the wheel as described above, there is a problem of protrusion of the drive system from the wheel.

SUMMARY OF THE INVENTION

Accordingly, the present invention has been made in view of the problems in the related art, and is directed toward providing an electric vehicle in which weight balance is easily achieved and a drive system such as a motor can be compactly disposed on a wheel.

In accordance with the present invention, an electric vehicle in which an output of a motor is transmitted to an axle through a reduction mechanism in order to rotate a wheel, the axle that passes through the wheel and that is substantially coaxially connected to the wheel is a hollow cylindrical shaft. The motor has a motor shaft inserted into a hollow portion of the cylindrical shaft substantially coaxially with the cylindrical shaft in a manner extending from both ends of the cylindrical shaft. On one side of the wheel, the motor is connected to a base end of the motor shaft extending from one end of the cylindrical shaft. On the other side of the wheel, the reduction mechanism is connected to a leading end of the motor shaft extending from the other end of the cylindrical shaft. The reduction mechanism rotates the cylindrical shaft in accordance with rotation of the motor shaft caused by driving of the motor.

Accordingly, the motor is disposed on one side of the wheel, and the reduction mechanism is disposed on the other side of the wheel. The motor shaft passes through the hollow portion of the cylindrical shaft serving as the axle connected to the wheel, and extends from the one side to the other side of the wheel. The motor is connected to the base end of the motor shaft, and the reduction mechanism is connected to the leading end of the motor shaft. In this manner, the motor is disposed on one side of the wheel, and on the other side of the wheel is the reduction mechanism, thereby easily achieving weight balance.

Also, the wheel, the cylindrical shaft, and the motor shaft are substantially coaxially disposed. The motor and the reduction mechanism are each connected to the motor shaft. Further, the reduction mechanism is connected to the wheel through the cylindrical shaft. Consequently, the drive system of the wheel, from the motor to the wheel through the motor shaft, the reduction mechanism, and the cylindrical shaft, is disposed on the axis of the wheel. Thus, the drive system can be compactly disposed on the wheel without protruding the drive system to the one side or the other side of the wheel. In addition, flexibility in the space around the wheel is increased. Also, in the reduction mechanism, the torque of the wheel can be easily increased in accordance with the rotational drive force of the motor.

In this manner, the periphery of the wheel is constructed as above, thereby allowing the realization of the electric vehicle in which weight balance is easily achieved and the drive system such as the motor can be compactly disposed on the wheel.

In further accordance with the present invention, the electric vehicle includes a double-sided swing arm for supporting the motor shaft, the cylindrical shaft, and the wheel by supporting the motor on the one side of the wheel and the reduction mechanism on the other side of the wheel.

By achieving weight balance as described above, it is possible to support the wheel, the cylindrical shaft, and the motor shaft on both sides through the motor and the reduction mechanism without unnecessary reinforcement (increase in stiffness) of the double-sided swing arm.

In further accordance with the present invention, the electric vehicle includes a motor module composed of the motor and a motor case for storing the motor, the motor module being removable from the swing arm and the wheel. The reduction mechanism module composed of the reduction mechanism and a reduction mechanism case for storing the reduction mechanism. The reduction mechanism module is removable from the swing arm and the wheel.

Therefore, the motor is modularized as the motor module, and the reduction mechanism is modularized as the reduction mechanism module, thereby facilitating the mounting/removal of the motor module (the motor) and the reduction mechanism module (the reduction mechanism) to/from the wheel or the replacement thereof, and allowing prevention of dust contamination with the adhesion or deposition of foreign particles, such as dirt and dust, to the motor or the reduction mechanism.

In further accordance with the present invention, the motor module is relatively rotatably mounted to the wheel through a first bearing, and the reduction mechanism module is relatively rotatably mounted to the wheel through a second bearing.

Therefore, the motor module is relatively rotatably mounted to the wheel through the first bearing, and the reduction mechanism module is relatively rotatably mounted to the wheel through the second bearing. Thus, mounting/removal of the motor module and the reduction mechanism module to/from the wheel or replacement thereof can be further facilitated.

In further accordance with the present invention, the motor module and the reduction mechanism module are mounted with suspensions. Thus, the shock due to uneven roads or the like is effectively absorbed, thereby allowing an improvement in the occupant ride quality of the electric vehicle.

In further accordance with the present invention, the motor is provided with a rotor substantially coaxially mounted to the base end of the motor shaft for rotating the motor shaft. The leading end of the motor shaft is supported by third bearings. Therefore, the base end of the motor shaft is fixed to the rotor, and the leading end of the motor shaft is supported by third bearings, thereby allowing an improvement in the operational efficiency of mounting/removal of the rotor and the reduction mechanism to/from the motor shaft or replacement thereof.

In further accordance with the present invention, the reduction mechanism is provided with a first gear, a second gear, a reduction shaft, a third gear, and a fourth gear. The first gear is formed at the leading end of the motor shaft. The second gear is disposed forwardly of the motor shaft and engages with the first gear. The reduction shaft is disposed forwardly of and substantially parallel to the cylindrical shaft and the motor shaft, and is substantially coaxially connected to the second gear. The third gear is formed on the reduction shaft on the other side of the wheel. The fourth gear is substantially coaxially connected to the cylindrical shaft on the other side of the wheel and engages with the third gear.

According to this structure, the second gear, the reduction shaft, and the third gear, which are major portions of the reduction mechanism, are provided forwardly of the cylindrical shaft and the motor shaft. Consequently, the center of gravity of the reduction mechanism is located forward with respect to the cylindrical shaft and the motor shaft, so that the electric vehicle having an excellent weight balance can be realized.

In further accordance with the present invention, the electric vehicle includes a brake for braking rotation of the wheel. The brake is disposed on the other side of the wheel, with the cylindrical shaft and the motor shaft passing through the brake.

Therefore, the brake is disposed on the other side of the wheel in a state of passing through the cylindrical shaft and the motor shaft, thereby enabling reliable braking of rotation of the wheel while achieving weight balance.

BRIEF DESCRIPTION OF THE DRAWINGS

FIG. 3 is a schematic plan view of a motor module, a reduction mechanism module, a motor shaft, an axle, and a rear wheel which are supported by a double-sided swing arm.

FIG. 4 is a partially-exploded perspective view of a left arm of the swing arm of FIG. 3.

FIG. 13 is a schematic plan view of the swing arm, the motor module, the reduction mechanism module, the motor shaft, the axle, and the rear wheel, illustrating the alternative construction of FIG. 12.

DETAILED DESCRIPTION OF THE PREFERRED EMBODIMENTS

Hereinafter, a preferred embodiment of an electric vehicle according to the present invention will be described in detail with reference to the accompanying drawings.

Figure 1:
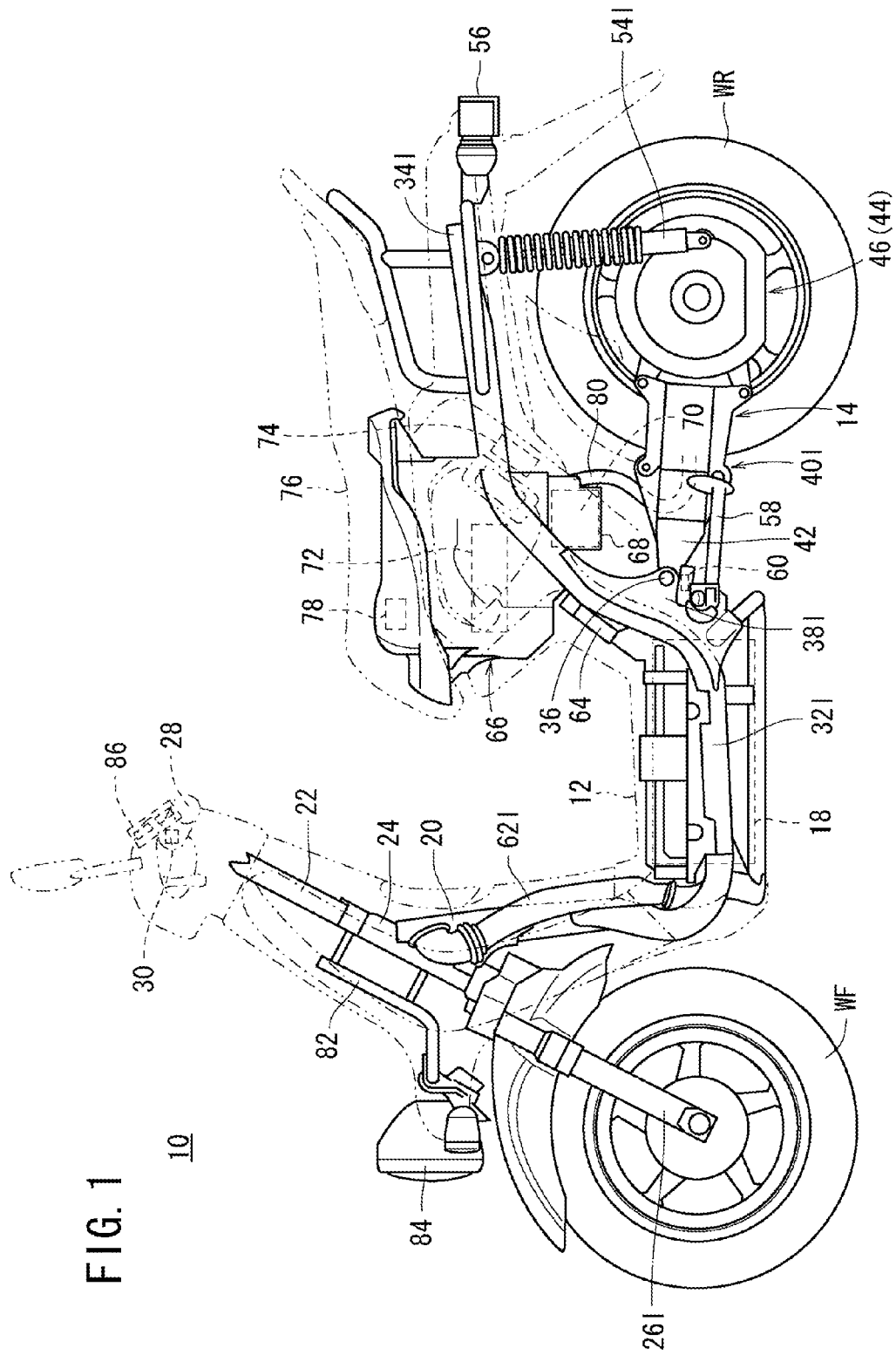
FIG. 1 is a left side view of a two-wheeled electric vehicle according to the present embodiment.
Figure 2:
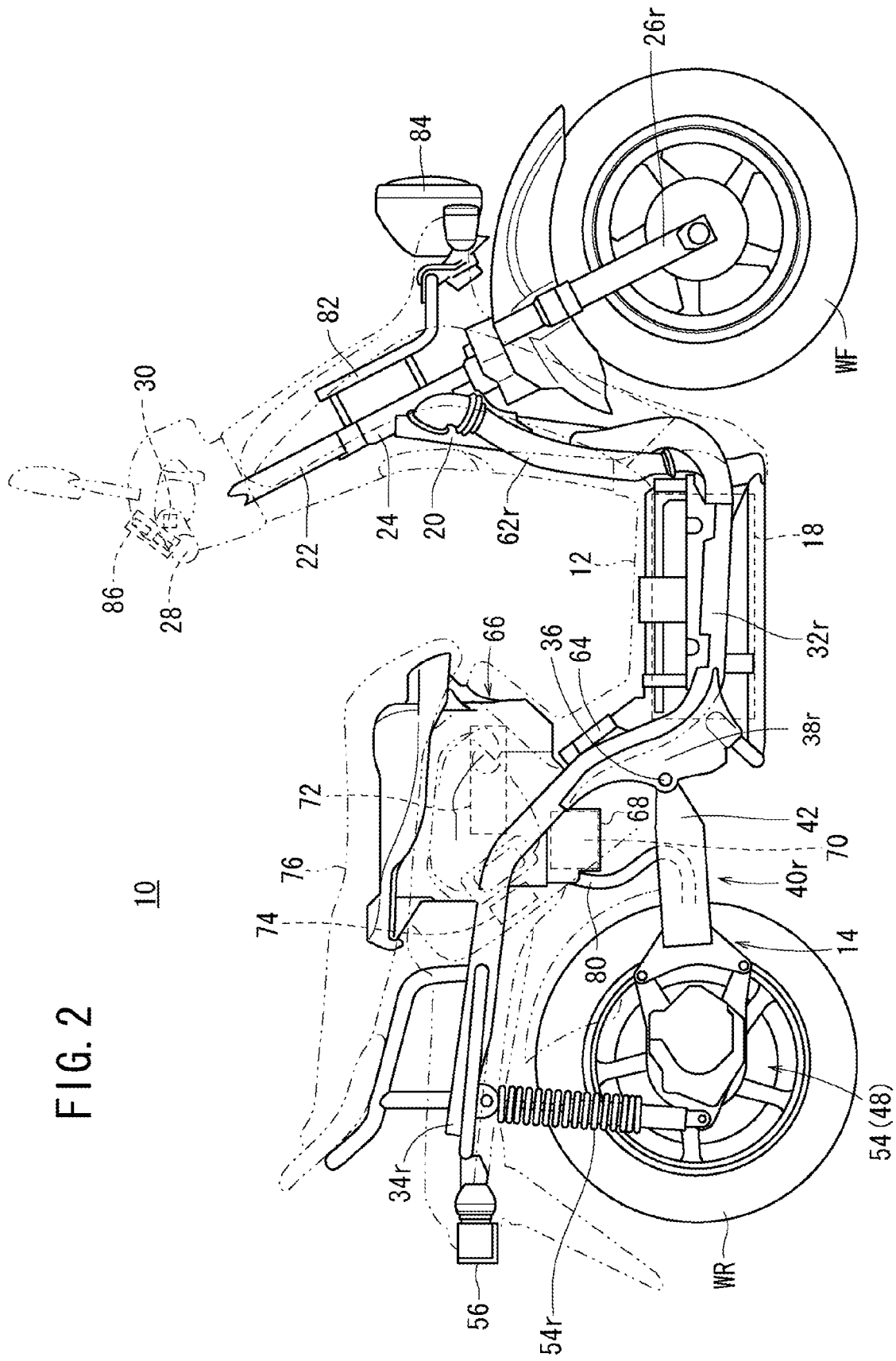
FIG. 2 is a right side view of the two-wheeled electric vehicle of FIG. 1.

FIG. 1 is a left side view of a two-wheeled electric vehicle (electric vehicle) 10 according to this embodiment. FIG. 2 is a right side view of the two-wheeled electric vehicle 10.

The two-wheeled electric vehicle 10 is a scooter type two-wheeled vehicle having a step floor 12, in which a rear wheel WR is driven by rotational drive force of a motor 16 (see FIG. 3) provided in a swing arm 14. A high-voltage (for example, 72 V) main battery 18 for supplying electric power to the motor 16 has plural modules with plural battery cells connected in series.

A head pipe 24 rotatably journaling a steering stem 22 is coupled to an upper end of a main frame 20. A pair of left and right front forks 26*l* and 26*r* rotatably journaling a front wheel WF is mounted to the steering stem 22. The front wheel WF can be steered by a steering handlebar 28 mounted to an upper portion of the steering stem 22 and having an accelerator grip. The steering handlebar 28 is provided with a throttle sensor 30 that detects an accelerator grip turning angle, i.e., an accelerator opening.

A pair of left and right side frames 32*l* and 32*r* extending rearwardly of a vehicle body are connected to the main frame 20. Rear frames 34*l* and 34*r* extending upwardly and rearwardly of the vehicle body are connected to the pair of left and right side frames 32*l* and 32*r*. Pivot plates 38*l* and 38*r* formed with a swing arm pivot 36 are mounted to rear portions of the side frames 32*l* and 32*r*.

A front end 42 of the double-sided swing arm 14 that supports the rear wheel WR with both left and right arms 40*l* and 40*r* is swingably journaled to the swing arm pivot 36. The rear wheel WR is rotatably journaled through an axle 52 (see FIG. 3) to a motor case 44 (a motor module 46 including the motor case 44) on the left side and a reduction mechanism case 48 (a reduction mechanism module 50 including the reduction mechanism case 48) on the right side, which serve as rear ends of the swing arm 14. The motor case 44 and the reduction mechanism case 48 are suspended from the rear frames 34*l* and 34*r* by rear suspensions 54*l* and 54*r*, respectively. Also, a taillight 56 is provided on the rear frames 34*l* and 34*r*.

A side stand 58 is provided on the pivot plate 38*l*. The side stand 58 has a side-stand switch 60 that outputs a detection signal when the side stand 58 is stored in a predetermined position.

Air introduction pipes 62*l* and 62*r* are connected to a front portion of the main battery 18. A suction fan 64 is provided on a rear portion of the main battery 18. The suction fan 64 allows air to be introduced into the main battery 18 from the air introduction pipes 62*l* and 62*r* and discharged rearwardly of the vehicle body. Thus, heat generated by the main battery 18 can be cooled by outside air.

A storage space 66 is provided between the pair of left and right rear frames 34*l* and 34*r*. A low-voltage (for example, 12

V) sub-battery 70, which is charged from the main battery 18 or from an external source, is stored in a storage space bottom 68 protruding downward from the storage space 66. Also, the storage space 66 is provided with a PDU (Power Drive Unit) 72 that transforms direct current supplied from the main battery 18 into alternating current to supply the current to the motor 16. A DC-DC down converter (hereinafter referred to as a down converter) 74 is provided at the rear of the storage space 66. A rider's seat 76, also serving as a lid of the storage space 66, is provided above the storage space 66. The rider's seat 76 is provided with a seat switch 78 that operates to output a seating signal when a rider sits on the seat 76. It should be noted that an electric power supply line 80 for supplying alternating current to the motor 16 from the PDU 72 is provided between the storage space 66 and the motor 16.

A bracket 82 is coupled to a front portion of the head pipe 24. A headlight 84 is mounted to a front end of the bracket 82. Also, a meter unit 86 for showing the vehicle speed or the like is provided in the vicinity of the steering handlebar 28.

Next, a construction around the rear wheel WR of the two-wheeled electric vehicle 10 will be described in relation to the double-sided swing arm 14 with reference to FIGS. 1 to 7.

The swing arm 14 is, as described above, the double-sided swing arm that supports the rear wheel WR with both the left and right arms 40*l* and 40*r*.

Specifically, the front end 42 (a fifth arm portion and an eighth arm portion) of the swing arm 14 is composed of: a hollow cylinder portion 42*a* allowing insertion of the swing arm pivot 36; arm portions 42*l* and 42*r* respectively extending rearward from both the left and right sides of the cylinder portion 42*a*; and a connection portion 42*b* connecting between both the left and right arm portions 42*l* and 42*r*.

The left arm 40*l* extends from the front end 42 to the left side (one side) of a wheel 90 constituting the rear wheel WR serving as a wheel assembly. In other words, the arm 40*l* is composed of: the above-described arm portion 42*l*; an arm portion 92 (a connection portion, a third arm portion) coupled to a rear portion of the arm portion 42*l* in a vehicle width direction; an arm portion 94 (a connection portion, a fourth arm portion) coupled to the arm portion 92 in the vehicle width direction; and the motor case 44 coupled to a rear portion of the arm portion 92 in the vehicle width direction.

Also, the motor case 44 is composed of: a storage portion 44*a* (a first arm portion) that is formed with a recessed portion allowing the reception of the motor 16; and a lid portion 44*b* (a second arm portion) that covers the storage portion 44*a* in the vehicle width direction with the motor 16 received in the recessed portion of the storage portion 44*a*, thereby closing the motor 16 in cooperation with the storage portion 44*a*. Therefore, the motor 16 is disposed in the storage portion 44*a*, and the storage portion 44*a* is covered with the lid portion 44*b* to constitute the motor case 44, so that the motor module 46 including the motor 16 and the motor case 44 is constituted.

The arm portions 42*l*, 92, 94, the storage portion 44*a*, and the lid portion 44*b* are coupled to one another in the vehicle width direction (the left-right direction in FIG. 3) of the two-wheeled electric vehicle 10.

More specifically, plate-like portions 96*a* and 96*b* extend vertically from a rear end of the arm portion 42*l*. Also, the arm portion 92 is a plate-like member, of generally substantially C-shaped cross-section, formed in such a manner that a front end thereof covers a rear end of the arm portion 42*l* and the left side of the plate-like portions 96*a* and 96*b*. On the right side of the arm portion 92, plate-like portions 98*a* and 98*b* extend vertically. Furthermore, the arm portion 94 is a plate-like member, of substantially C-shaped cross section, opposed to the arm portion 92 of substantially C-shaped cross section. On the left side of the arm portion 94, plate-like portions 100*a* and 100*b* extend vertically opposite to the plate-like portions 98*a* and 98*b*, respectively. Moreover, on a front end of the storage portion 44*a*, arm portions 102*a* and 102*b* extend forwardly toward the plate-like portions 98*a* and 98*b* of the arm portion 92.

Therefore, with front ends of the plate-like portions 98*a* and 98*b* superposed on rear ends of the plate-like portions 96*a* and 96*b*, bolts 110*a* and 110*b* are respectively inserted into bores 108*a* and 108*b* formed in the front ends of the plate-like portions 98*a* and 98*b*, and threaded into nuts 112*a* and 112*b* welded and fixed to the rear ends of the plate-like portions 96*a* and 96*b* in the vehicle width direction, thereby allowing coupling between the arm portion 42*l* and the arm portion 92 in the vehicle width direction.

Also, with central portions of the plate-like portions 98*a* and 98*b* superposed on the plate-like portions 100*a* and 100*b*, bolts 118*a* to 118*c* are inserted into a total of three bores 114*a* to 114*c* (two bores 114*a* and 114*b* of the plate-like portion 98*a* and a single bore 114*c* of the plate-like portion 98*b*) formed in the central portions of the plate-like portions 98*a* and 98*b*, and three bores 116*a* to 116*c* formed opposite to the three bores 114*a* to 114*c*, respectively, in the plate-like portions 100*a* and 100*b*, and threaded into weld nuts 120*a* to 120*c* fixed to the plate-like portions 100*a* and 100*b*, thereby allowing coupling between the arm portion 92 and the arm portion 94 in the vehicle width direction.

Furthermore, with rear ends of the plate-like portions 98*a* and 98*b* superposed on leading ends of the arm portions 102*a* and 102*b*, bolts 126*a* and 126*b* are inserted into bores 122*a* and 122*b* formed in the rear ends of the plate-like portions 98*a* and 98*b*, respectively, and threaded into threaded bores 124*a* and 124*b* formed in the leading ends of the arm portions 102*a* and 102*b*, respectively, thereby allowing coupling between the arm portion 92 and the arm portions 102*a* and 102*b* (the storage portion 44*a* including the arm portions 102*a* and 102*b*) in the vehicle width direction.

Moreover, four threaded holes 128*a* to 128*d* are circumferentially formed in the storage portion 44*a* that is substantially circular in side view. Also, bores 130*a* to 130*d* are formed opposite to the threaded holes 128*a* to 128*d*, respectively, in the substantially disk-shaped lid portion 44*b* (see FIG. 6). Therefore, with the bores 130*a* to 130*d* aligned with the threaded holes 128*a* to 128*d*, bolts 132*a* to 132*d* are inserted into the bores 130*a* to 130*d* and threaded into the threaded holes 128*a* to 128*d*, respectively, thereby allowing coupling between the lid portion 44*b* and the storage portion 44*a* in the vehicle width direction.

It should be noted that the bottom of the storage portion 44*a* is machined flat, and the bottom of the lid portion 44*b* is also machined flat so as to correspond to the bottom of the storage portion 44*a*. Also, an arm portion 102*c* extends rearward on a rear portion of the storage portion 44*a*. The rear suspension 54*l* is connected to a bore 124*c* formed in a leading end portion of the arm portion 102*c*.

An expanded portion 134 expanding forward is formed at a portion in between the arm portions 102*a* and 102*b* of the storage portion 44*a*. Also, an expanded portion 136 expanding forward, which corresponds to the expanded portion 134, is formed on the lid portion 44*b*.

The motor 16 is an inner rotor type three-phase motor that is composed of: a motor shaft 16*a* substantially coaxially inserted into the hollow cylindrical axle 52 (see FIG. 7); a rotor 16*b* substantially coaxially connected to the motor shaft 16*a*; and an annular stator 16*c* surrounding the rotor 16*b*. The motor 16 is stored in the motor case 44 by fixing the stator 16*c* to the recessed portion of the storage portion 44a and disposing, within the stator 16c, the rotor 16b with the motor shaft 16a passing therethrough (see FIGS. 3, 5, and 6). In this case, bus bar connecting terminals 138a to 138c (connecting portions), facing forward, are provided at a portion of the motor 16 toward the expanded portions 134 and 136, in such a manner as to be sandwiched between the expanded portions 134 and 136.

Figure 5A:
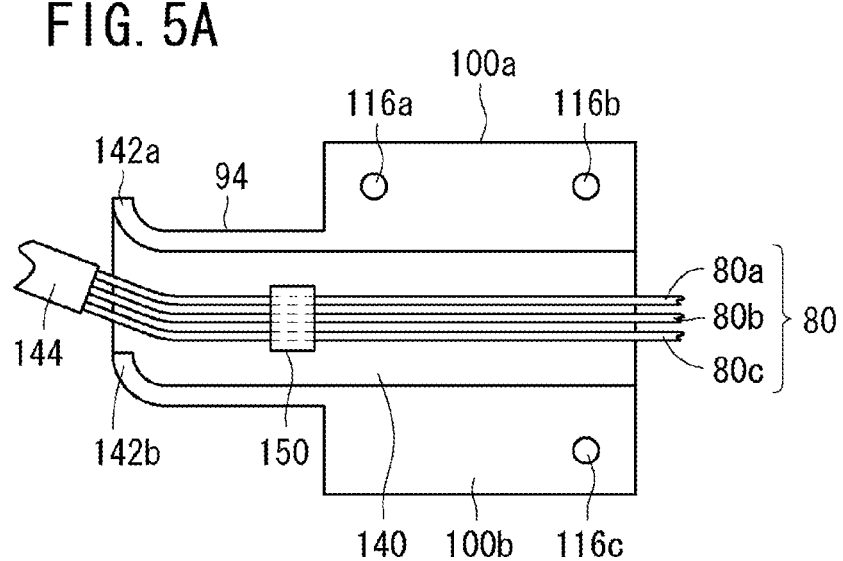
FIG. 5A is a side view of an arm portion of FIG. 4.
Figure 5B:
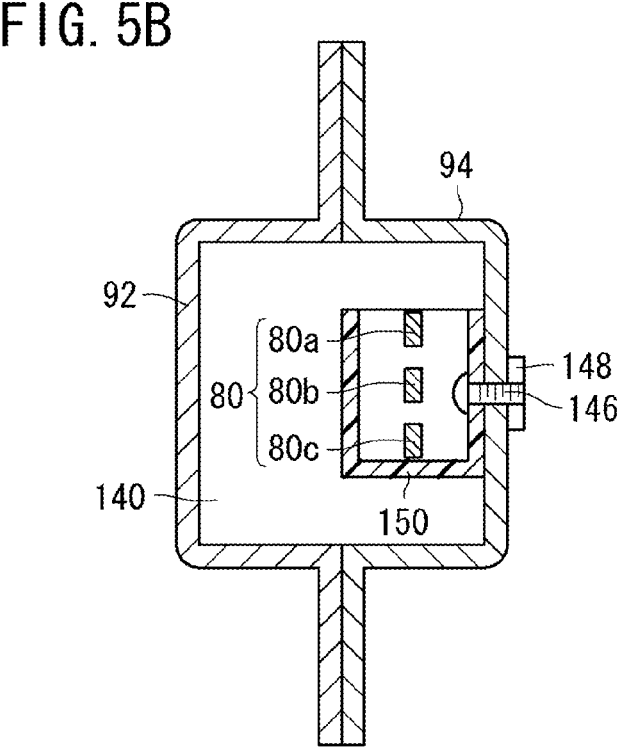
FIG. 5B is a sectional view of the arm portion of FIG. 4.
Figure 6:
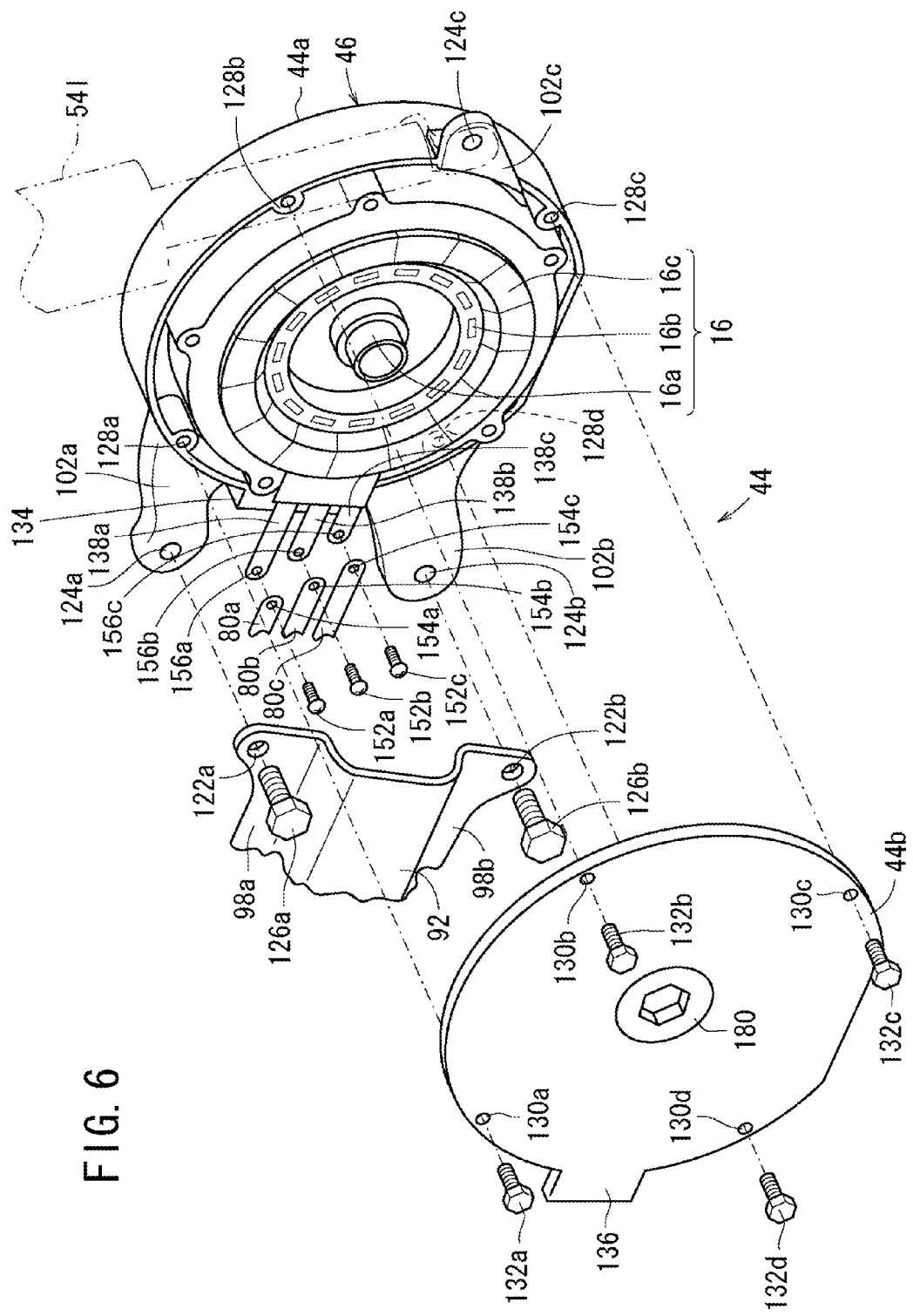
FIG. 6 is an exploded perspective view of the motor module of FIG. 3.

As described above, the arm portions 92 and 94 of substantially C-shaped cross section are coupled to each other in the vehicle width direction, thereby forming a longitudinally-extending hollow portion 140 at the C-shaped portions by coupling between the respective arm portions 92, 94 (see FIGS. 5A and 5B). Also, the electric power supply line 80 runs from the PDU 72 (see FIGS. 1 to 3). The electric power supply line 80 extends downward from the rear of the storage space 66 storing the PDU 72 and passes the side of the arm portion 42l of the swing arm 14 to enter the hollow portion 140 through between leading ends 142a and 142b of the arm portion 94 which is upwardly curved in an arc, and reach the connecting terminals 138a to 138c.

In this case, the electric power supply line 80 is composed of bus bars 80a to 80c as a three-phase line. The bus bars 80a to 80c, between the storage space 66 and the leading ends 142a and 142b of the arm portion 94, are externally electrically insulated by an insulating sheath 144. Within the hollow portion 140, a supporting member 150 of substantially C-shaped cross section made of an electrical insulating material is fixed to the arm portion 94 by threaded engagement of a screw 146 with a nut 148. Thus, the bus bars 80a to 80c are supported by the supporting member 150 in such a way as to prevent contact with the arm portions 92 and 94. Also, bores 154a to 154c allowing insertion of screws 152a to 152c are formed in leading ends of the bus bars 80a to 80c toward the motor 16.

Therefore, the screws 152a to 152c are inserted into the bores 154a to 154c and threaded into threaded bores 156a to 156c formed in the connecting terminals 138a to 138c, respectively, thereby allowing fixation (connection) of the bus bars 80a to 80c to the connecting terminals 138a to 138c, respectively. Consequently, the rotor 16b and the motor shaft 16a can be driven to rotate by supplying three-phase alternating current to the motor 16 from the PDU 72 through the bus bars 80a to 80c and the connecting terminals 138a to 138c.

On the other hand, the right arm 40r extends from the front end 42 to the right side (the other side) of the wheel 90 (see FIGS. 2 and 3). In other words, the arm 40r is composed of the above-described arm portion 42r, and the reduction mechanism case 48 coupled to a rear portion of the arm portion 42r.

Also, the reduction mechanism case 48 is composed of: a first storage portion 48a that is provided on the right side of the wheel 90 and formed with a recessed portion allowing the reception of a reduction mechanism 160; a second storage portion 48b that is coupled to the first storage portion 48a in the vehicle width direction in such a manner as to surround a side portion of the reduction mechanism 160; and a lid portion 48c (a seventh arm portion) that covers the second storage portion 48b in the vehicle width direction with the reduction mechanism 160 disposed in the first and second storage portions 48a and 48b (sixth arm portions), thereby closing the reduction mechanism 160 in cooperation with the first and second storage portions 48a and 48b. Therefore, the reduction mechanism 160 is disposed in the first and second storage portions 48a and 48b, and the second storage portion 48b is covered with the lid portion 48c to constitute the reduction mechanism case 48, so that the reduction mechanism module 50 including the reduction mechanism 160 and the reduction mechanism case 48 is constituted.

In the arm 40r, the arm portion 42r, the first storage portion 48a, the second storage portion 48b, and the lid portion 48c are coupled to one another in the vehicle width direction.

More specifically, a plate-like portion 162 that is V-shaped in side view extends rearward from a rear end of the arm portion 42r. Also, arm portions 164a and 164b extend toward the plate-like portion 162 from the first storage portion 48a. Therefore, bolts 166a and 166b are inserted into two bores, not shown, of the plate-like portion 162 and threaded into threaded holes, not shown, of the arm portions 164a and 164b, respectively, thereby allowing coupling between the plate-like portion 162 (of the arm portion 42r) and the arm portions 164a and 164b (of the first storage portion 48a) in the vehicle width direction. Also, the first storage portion 48a, the second storage portion 48b, and the lid portion 48c can be sequentially coupled in the vehicle width direction by using bolts not shown or the like.

It should be noted that an arm portion 164c extends rearward on a rear portion of the first storage portion 48a. The rear suspension 54r is connected to a bore 168 formed in a leading end portion of the arm portion 164c. The rear suspension 54r is connected to the arm portion 164c forwardly with respect to the rear suspension 54l in a plan view of FIG. 3.

The reduction mechanism 160 is connected to the motor shaft 16a extended even to the right side of the wheel 90. Also, the reduction mechanism 160 rotates the axle 52 at a rotational speed lower than that of the motor shaft 16a rotated by driving of the motor 16, thereby rotating the rear wheel WR including the wheel 90 connected to the axle 52.

Figure 7:
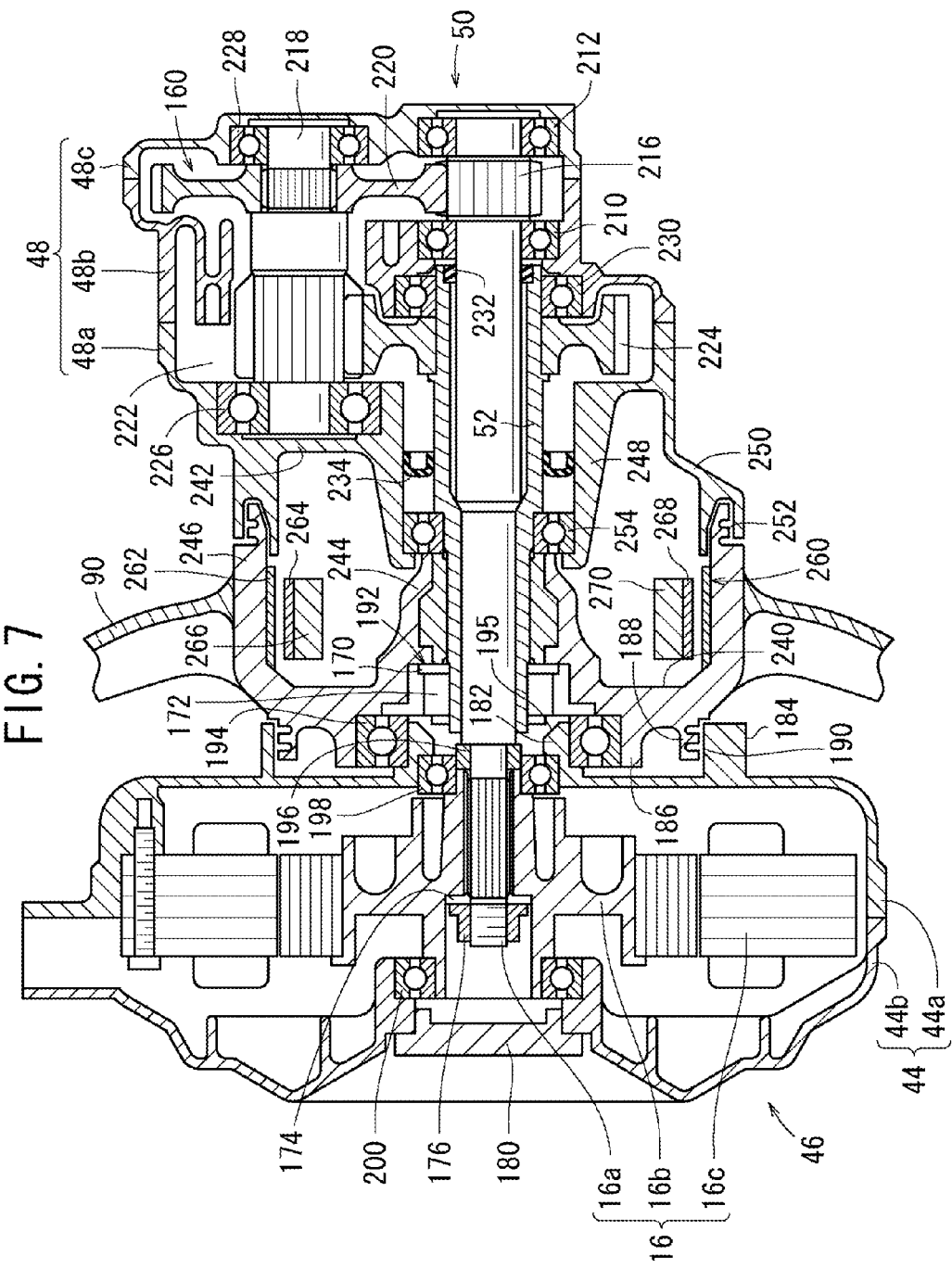
FIG. 7 is a sectional view of the motor module, the reduction mechanism module, the motor shaft, the axle, and the rear wheel of FIG. 3.

Next, a more concrete explanation of the wheel 90, and the motor module 46 and the reduction mechanism module 50 respectively disposed on the left and right sides of the wheel 90, will be made with reference to a sectional view of FIG. 7.

The hollow cylindrical axle 52 passes substantially coaxially through the wheel 90 constituting the rear wheel WR serving as the wheel assembly. In this case, the outer and inner diameters of a left-hand portion of the axle 52 passing through the wheel 90 are smaller than those of a right-hand portion thereof connected to the reduction mechanism 160. Consequently, the axle 52 is formed as a cylindrical shaft having a shoulder. Also, a portion on an outer peripheral surface of the axle 52 which passes through the wheel 90 is subjected to spline processing to engage spline grooves of the wheel 90 (see FIGS. 3 and 7). Further, a thread groove (threaded portion), not shown, is formed at a left end (one end) of the axle 52 protruding slightly from the wheel 90. Therefore, with a washer 170 attached to the axle 52, a nut 172 is threaded onto the thread groove, thereby allowing coupling between the wheel 90 and the axle 52. It should be noted that the thread groove, the washer 170, and the nut 172 constitute a coupling portion 192 for coupling the wheel 90 and the axle 52.

The motor shaft 16a is substantially coaxially inserted into the axle 52 so as to extend on both sides from both ends of the axle 52. In this case, the motor shaft 16a is formed as a columnar shaft having a shoulder so as to conform to the shape of a hollow portion of the axle 52.

The motor shaft 16a passes through the rotor 16b of the motor 16. A thread groove, not shown, is formed at a left end of the motor shaft 16a protruding leftward from the rotor 16b. With a washer 174 attached to the motor shaft 16a, a nut 176 is threaded onto the thread groove, thereby allowing coupling between the motor shaft 16a and the rotor 16b. Also, a removable cap 180 is disposed at a central portion of the lid portion 44b, opposite to the left end of the motor shaft 16a.

Also, on the side of the storage portion 44a toward the wheel 90, there are provided annular protruding portions 182 and 184 protruding toward the wheel 90 in such a manner as to surround the motor shaft 16a. On the side of the wheel 90 toward the storage portion 44a, there are provided, between the above-described protruding portions 182 and 184, annular protruding portions 186 and 188 protruding toward the storage portion 44a in such a manner as to surround the motor shaft 16a.

In this case, between the protruding portion 184 of the storage portion 44a and the protruding portion 188 of the wheel 90 is a labyrinth structure 190.

Also, a bearing 194 (a first bearing) is disposed between the protruding portions 182 and 186 provided inwardly with respect to the protruding portions 184 and 188. The motor case 44 (the motor module 46) is supported in a relatively rotatable manner with respect to the wheel 90 by the bearing 194. Consequently, the labyrinth structure 190 prevents stones, etc. scattered by the rear wheel WR during travel of the two-wheeled electric vehicle 10 from being directly splashed onto the bearing 194. It should be noted that a seal bearing is employed as the bearing 194 to seal a space toward the motor shaft 16a.

Furthermore, a portion of the protruding portion 182 opposite the nut 172 is formed as a tapered portion 195 that is tapered so as to deviate from the nut 172 (so as to spread toward the nut 172).

Moreover, a portion of the motor shaft 16a which is in between the rotor 16b and the axle 52 is formed with a shoulder. A collar 196 is attached to the shoulder. Also, a bearing 198 is inserted between the rotor 16b, the collar 196, and the protruding portion 182. On the other hand, a bearing 200 is attached between the side of the rotor 16b toward the cap 180, and the lid portion 44b. The motor case 44 is supported in a relatively rotatable manner with respect to the motor shaft 16a and the rotor 16b by the bearings 198 and 200. It should be noted that the bearings 198 and 200 are also seal bearings.

On the other hand, the right end of the motor shaft 16a is supported through bearings 210 and 212 by the second storage portion 48b and the lid portion 48c.

The reduction mechanism 160 is composed of: a gear portion 216 (a first gear) formed at a portion of the motor shaft 16a which is in between the bearings 210 and 212; a reduction shaft 218 disposed forwardly with respect to the motor shaft 16a and the axle 52, and substantially parallel to the motor shaft 16a and the axle 52; a gear 220 (a second gear) disposed on the side of the reduction shaft 218 toward the lid portion 48c, and engaging with the gear portion 216; a gear portion 222 (a third gear) formed on the side of the reduction shaft 218 toward the wheel 90; and a gear 224 (a fourth gear) disposed on a right end of the axle 52 and engaging with the gear portion 222.

Also, within the reduction mechanism case 48, both ends of the reduction shaft 218 are supported through bearings 226 and 228 by the first storage portion 48a and the lid portion 48c. The gear 224 is fixed through a bearing 230 to the right end of the axle 52 and the second storage portion 48b. Further, the reduction mechanism 160 is injected with oil so as to prevent seizing up of the gear portions 216 and 222 and the gears 220 and 224. Therefore, oil seals 232 and 234 are inserted between the right end of the axle 52 and the motor shaft 16a, and between the side of the first storage portion 48a toward the wheel 90, and the axle 52, respectively.

An annular recessed portion 240 is formed at a portion of the wheel 90 opposite the first storage portion 48a. Also, an annular recessed portion 242 is formed opposite to the annular recessed portion 240 on the side of the first storage portion 48a toward the wheel 90. Thus, annular protruding portions 244 and 246 protruding toward the first storage portion 48a in a manner surrounding the axle 52 are formed on a right side surface of the wheel 90. Also, annular protruding portions 248 and 250 protruding toward the wheel 90 in a manner surrounding the axle 52 are formed on the side of the first storage portion 48a toward the wheel 90.

In this case, a labyrinth structure 252 is formed between the protruding portion 246 of the wheel 90 and the protruding portion 250 of the first storage portion 48a. The labyrinth structure 252 seals a space on the inside of the protruding portions 246 and 250 formed by the annular recessed portions 240 and 242.

Also, a bearing 254 (a second bearing) serving as a seal bearing is provided between the axle 52 and each of the protruding portions 244 and 248 formed inwardly with respect to the protruding portions 246 and 250, respectively. The reduction mechanism case 48 (the reduction mechanism module 50) is supported in a relatively rotatable manner with respect to the wheel 90 by the bearing 254.

Furthermore, a drum brake 260 is provided toward the annular recessed portion 240 in the sealed space formed by the labyrinth structure 252, in such a manner as to surround the axle 52.

The drum brake 260 is a well-known drum brake mechanism, and composed of a drum 262 attached to the wheel 90, a leading shoe 266 mounted with a lining 264, and a trailing shoe 270 mounted with a lining 268. In this case, a spring member, not shown, is inserted between the leading shoe 266 and the trailing shoe 270. When the leading shoe 266 and the trailing shoe 270 are longitudinally moved away from each other against the tension of the spring member by a hydraulic cylinder or the like, the lining 264 of the leading shoe 266 and the lining 268 of the trailing shoe 270 press against the drum 262, thereby enabling braking of rotation of the wheel 90 attached with the drum 262.

It should be noted that in this embodiment, a disc brake may of course be used in place of the drum brake 260 as long as it can brake the rotation of the wheel 90.

The two-wheeled electric vehicle 10 according to this embodiment is constructed as above. Next, mounting/removal of the rear wheel WR, the motor module 46, and the reduction mechanism module 50 to/from the two-wheeled electric vehicle 10, and replacement (both of mounting and removal) thereof will be described with reference to FIGS. 1 to 7.

First of all, mounting of the rear wheel WR, the motor module 46, and the reduction mechanism module 50 to the two-wheeled electric vehicle 10 will be described.

Firstly, the reduction mechanism module 50 with the motor shaft 16a and the axle 52 mounted is mounted to the two-wheeled electric vehicle 10. In this case, an operator couples the plate-like portion 162 and the arm portions 164a and 164b in the vehicle width direction by inserting the bolts 166a and 166b into the two holes of the plate-like portion 162 extending from the arm portion 42r of the swing arm 14, and threading the bolts 166a and 166b into the threaded holes, not shown, of the arm portions 164a and 164b provided on the reduction mechanism module 50. Also, the operator attaches the drum brake 260 to the axle 52 and then connects the rear suspension 54r to the bore 168 of the arm portion 164c.

Next, the rear wheel WR serving as the wheel assembly is mounted to the axle 52.

In this case, the operator mounts the rear wheel WR to the axle 52 in such a manner that the spline structure formed on the left end of the axle 52 fits the spline grooves formed in the wheel 90. It should be noted that the bearing 194 is also previously attached to the wheel 90.

And then the operator tightens the nut 172 with a wrench with the rear wheel WR fixed.

Next, the operator mounts the motor module 46 to the motor shaft 16*a*.

In this case, the operator attaches the collar 196 to the motor shaft 16*a*, and then mounts the motor module 46 to the motor shaft 16*a* in such a manner that the motor shaft 16*a* is inserted into the hollow portion (the central axis) of the rotor 16*b*. Then after the cap 180 is removed from the lid portion 44*b* and the washer 174 is attached to the motor shaft 16*a*, the nut 176 is threaded onto the thread groove of the motor shaft 16*a* so as to fix the motor shaft 16*a* and the rotor 16*b*. After fixing the motor shaft 16*a* and the rotor 16*b*, the operator mounts the cap 180 to the lid portion 44*b* and then mounts the rear suspension 54*l* to the bore 124*c* of the arm portion 102*c*.

Next, the arm portions 42*l*, 92, and 94, and the motor case 44 are coupled in the vehicle width direction.

In this case, firstly, the bus bars 80*a* to 80*c* and the connecting terminals 138*a* to 138*c* are connected to each other. That is, the screws 152*a* to 152*c* are inserted into the bores 154*a* to 154*c* and threaded into the threaded bores 156*a* to 156*c* of the connecting terminals 138*a* to 138*c*, respectively, thereby connecting the bus bars 80*a* to 80*c* and the connecting terminals 138*a* to 138*c*.

Next, the arm portion 92 and the arm portion 42*l* are coupled to each other in the vehicle width direction. Also, the arm portion 92 and the arm portions 102*a* and 102*b* are coupled to each other in the vehicle width direction.

In this case, the bolts 126*a* and 126*b* are inserted into the bores 122*a* and 122*b* of the plate-like portions 98*a* and 98*b* of the arm portion 92 and threaded into the threaded bores 124*a* and 124*b* of the arm portions 102*a* and 102*b*, thereby allowing coupling between the arm portion 92 and the arm portions 102*a* and 102*b* in the vehicle width direction. Also, the bolts 110*a* and 110*b* are inserted into the bores 108*a* and 108*b* of the plate-like portions 98*a* and 98*b* and threaded into the nuts 112*a* and 112*b*, respectively, thereby allowing coupling between the arm portion 42*l* and the arm portion 92 in the vehicle width direction.

Furthermore, with the bus bars 80*a* to 80*c* supported by the supporting member 150, the bolts 118*a* to 118*c* are inserted into the bores 114*a* to 114*c* and the bores 116*a* to 116*c* and threaded into the weld nuts 120*a* to 120*c*, respectively, thereby allowing coupling between the arm portion 92 and the arm portion 94 in the vehicle width direction. Also, the bus bars 80*a* to 80*c* can be supported within the hollow portion 140 without making contact with inner walls of the arm portions 92 and 94.

In the above-described manner, the rear wheel WR, the motor module 46, and the reduction mechanism module 50 can be mounted to the two-wheeled electric vehicle 10.

Next, as to removal of the rear wheel WR, the motor module 46, and the reduction mechanism module 50 from the two-wheeled electric vehicle 10, it can be performed by reversing the above-described mounting procedure.

In this embodiment, the left arm 40*l* of the swing arm 14 can be separated into the arm portions 42*l*, 92, 94, and the motor case 44. Also, in side view, the outer periphery or outside of the rear wheel WR is a separation point (a separation point between the arm portion 42*l* and the arm portion 92). Consequently, the motor module 46 and the rear wheel WR can be removed in one direction by releasing the coupling in the vehicle width direction of the arm portions 42*l*, 92, and 94. It should be noted that the concept of the outer periphery of the rear wheel WR is not limited to the outer periphery itself but includes the vicinity of the outer periphery (portions of a diameter slightly smaller or larger than the outside diameter of the rear wheel WR).

Also, replacement of the rear wheel WR, the motor module 46, and the reduction mechanism module 50 can be easily performed by adopting the above-described mounting and removal procedures.

As described above, in the two-wheeled electric vehicle 10 according to this embodiment, the motor 16 is disposed on the left side (one side) of the wheel 90, while the reduction mechanism 160 is disposed on the right side (the other side) of the wheel 90. In this case, the motor shaft 16*a* passes through the hollow portion of the axle 52 connected to the wheel 90 to extend from both ends of the axle 52. Also, the rotor 16*b* of the motor 16 is connected to the left end of the motor shaft 16*a*, while the reduction mechanism 160 is connected to the right end of the motor shaft 16*a*. In this manner, the motor 16 is disposed on one side of the wheel 90, and on the other side of the wheel 90 is the reduction mechanism 160, thereby easily achieving weight balance. In addition, the motor shaft 16*a* is inserted into the hollow portion of the axle 52 substantially coaxially with the axle 52. Thus, the shaft for rotating the wheel 90 has a double structure of the motor shaft 16*a* and the axle 52, thereby allowing an increase in stiffness of the shaft.

Also, the wheel 90, the axle 52, and the motor shaft 16*a* are substantially coaxially disposed. The motor 16 and the reduction mechanism 160 are each connected to the motor shaft 16*a*. Further, the reduction mechanism 160 is connected to the wheel 90 through the axle 52. Consequently, a drive system of the wheel 90, from the motor 16 to the wheel 90 through the motor shaft 16*a*, the reduction mechanism 160, and the axle 52, is disposed on the axis of the wheel 90. Thus, the drive system can be compactly disposed on the wheel 90 without protruding the drive system to the left or right side of the wheel 90. In addition, flexibility in the space around the wheel 90 is increased. Also, in the reduction mechanism 160, the torque of the wheel 90 can be easily increased in accordance with the rotational drive force of the motor 16.

In this manner, in this embodiment, the periphery of the wheel 90 is constructed as above, thereby allowing the realization of the two-wheeled electric vehicle 10 in which weight balance is easily achieved and the drive system, such as the motor 16, can be compactly disposed on the wheel 90.

Also, by achieving weight balance as described above, it is possible to support the wheel 90, the axle 52, and the motor shaft 16*a* on both sides through the motor module 46 including the motor 16 and the reduction mechanism module 50 including the reduction mechanism 160, without unnecessary reinforcement (increase in stiffness) or increase in weight of the double-sided swing arm 14.

Furthermore, the motor 16 is modularized as the motor module 46, and the reduction mechanism 160 is modularized as the reduction mechanism module 50, thereby facilitating the mounting/removal of the motor module 46 (the motor 16) and the reduction mechanism module 50 (the reduction mechanism 160) to/from the wheel 90 or the replacement thereof, and allowing prevention of dust contamination with the adhesion or deposition of foreign particles, such as dirt and dust, to the motor 16 or the reduction mechanism 160.

Moreover, the motor module 46 is relatively rotatably mounted to the wheel 90 through the bearing 198, and the reduction mechanism module 50 is relatively rotatably mounted to the wheel 90 through the bearing 254. Thus, mounting/removal of the motor module 46 and the reduction mechanism module 50 to/from the wheel 90 or replacement thereof can be further facilitated.

Also, the rear suspensions 54*l* and 54*r* are mounted to the motor module 46 and the reduction mechanism module 50, respectively. Thus, the shock due to uneven roads or the like is effectively absorbed, thereby allowing an improvement in the occupant ride quality of the two-wheeled electric vehicle 10.

Furthermore, the left end of the motor shaft 16*a* is fixed to the rotor 16*b*, and the right end of the motor shaft 16*a* is supported by the bearings 210 and 212 provided on the reduction mechanism 160, thereby allowing an improvement in the operational efficiency of mounting/removal of the rotor 16*b* and the reduction mechanism 160 to/from the motor shaft 16*a* or replacement thereof.

Moreover, the reduction shaft 218, the gear 220, and the gear portion 222, which are major portions of the reduction mechanism 160, are provided in front of the axle 52 and the motor shaft 16*a*. Consequently, the center of gravity of the reduction mechanism 160 is located forward with respect to the axle 52 and the motor shaft 16*a*, so that the two-wheeled electric vehicle 10 having an excellent weight balance can be realized.

Also, the drum brake 260 is disposed on the right side of the wheel 90 in a state of passing through the axle 52 and the motor shaft 16*a*. This allows reliable braking of rotation of the wheel 90 while achieving weight balance.

Also, in the two-wheeled electric vehicle 10 according to this embodiment, the left side (the left arm 40*l*) of the swing arm 14 with respect to the wheel 90 is composed of the plural arm portions 42*l*, 92, and 94 and the motor case 44 which can be separated. Thus, the wheel 90 and the motor 16 can be removed or mounted in one direction just by removing the arm portions 92 and 94 from the two-wheeled electric vehicle 10, on the left side of the wheel 90. In other words, removal or mounting of the rear wheel WR (the wheel assembly) and the motor case 44 can be easily performed from the left side of the wheel 90 by removing the arm portions 92 and 94 from the two-wheeled electric vehicle 10. Thus, the operational efficiency of mounting and removal of the wheel 90 and the motor 16 can be improved. Further, since the motor case 44 is one element of the left arm 40*l*, it is possible to suppress an increase in the number of components.

In this manner, in this embodiment, the periphery of the wheel 90 is constructed as above, thereby allowing the realization of the two-wheeled electric vehicle 10 in which weight balance is easily achieved and the operational efficiency of mounting, removal, and replacement of the wheel 90 and the motor 16 can be improved.

Furthermore, the electric power supply line 80 is provided within the hollow portion 140 of the arm portions 92 and 94 connected to the motor case 44, thereby allowing proper protection of the electric power supply line 80 and enhancing the appearance in the portion of the two-wheeled electric vehicle 10 where the swing arm 14 is located. Also, even if the arm portions 92 and 94 are each made of a metal material, the supporting member 150 prevents contact between the inner walls of the arm portions 92 and 94 and the electric power supply line 80. Thus, shorts in the electric power supply line 80 can be reliably prevented.

Also, the connecting terminals 138*a* to 138*c* provided on the motor 16 and the bus bars 80*a* to 80*c* composing the electric power supply line 80 are connected to each other in front of the motor case 44. Thus, a connecting region between the motor 16 and the electric power supply line 80 can be protected. In this manner, the connecting terminals 138*a* to 138*c* serve as portions for fixing the bus bars 80*a* to 80*c*, thereby facilitating mounting of the bus bars 80*a* to 80*c* to the connecting terminals 138*a* to 138*c*.

The arm portions 42*l*, 92, and 94 and the motor case 44 are coupled to one another in the vehicle width direction. Thus, an operator, while being on the left of the two-wheeled electric vehicle 10, can perform removal/mounting or replacement of the wheel 90 and the motor 16, thereby allowing an improvement in operational efficiency while reducing the operator's work burdens. Also, the arm portions 42*l*, 92, and 94 and the motor case 44 are coupled to one another in the vehicle width direction. Thus, it is only necessary to remove only the element of an operation object, so that the operational efficiency can be further improved. Also, the arm portions 92 and 94 are coupled to each other in the vehicle width direction, thereby allowing reliable formation of the hollow portion 140 for insertion of the electric power supply line 80.

Furthermore, the arm portions 42*l*, 92, and 94 and the motor case 44 are coupled to one another in the vehicle width direction by using the plural bolts 110*a*, 110*b*, 118*a* to 118*c*, 126*a*, 126*b*, 132*a* to 132*d*, the nuts 112*a* and 112*b*, and the weld nuts 120*a* to 120*c*. Thus, the operator can further efficiently perform the mounting/removal or replacement operation.

The right side (the right arm 40*r*) of the swing arm 14 with respect to the wheel 90 is also composed of the arm portion 42*r* and the reduction mechanism case 48 which can be separated. Therefore, removal/mounting of the reduction mechanism 160 from/to the two-wheeled electric vehicle 10 or replacement thereof can be performed on the right side of the wheel 90. Also in this case, the operational efficiency of mounting, removal, and replacement of the reduction mechanism 160 can be improved.

Also, the reduction mechanism case 48 is designed to serve as an element of the arm 40*r*, thereby allowing suppression of an increase in the number of components. Further, since the arm portion 42*r* and the reduction mechanism case 48 are coupled in the vehicle width direction by the bolts 166*a* and 166*b*, it is only necessary to remove only the reduction mechanism case 48, so that the operational efficiency can be improved.

Moreover, the bottom of the motor case 44 is formed substantially flat. Thus, contact of the lower surface of the motor case 44 with the ground can be suppressed.

Furthermore, in the two-wheeled electric vehicle 10 according to this embodiment, as described above, the motor 16 is connected to the left end of the motor shaft 16*a* which is one end of the wheel 90, and on the other side thereof, the reduction mechanism 160 is connected to the right end of the motor shaft 16*a*. Thus, weight balance is easily achieved. In addition, between the wheel 90 and the motor case 44, the left end of the axle 52 and the wheel 90 are coupled to each other by the coupling portion 192. Also, the labyrinth structure 190 seals the space in between the wheel 90 and the motor case 44 in a manner surrounding the coupling portion 192. Consequently, the coupling portion 192 is disposed in the sealed space sealed by the labyrinth structure 190. Thus, the coupling portion 192 can be protected from disturbance such as stones scattered by the rear wheel WR during travel of the two-wheeled electric vehicle 10 or access to the nut 172 by a person such as an occupant. Also, intrusion of mud, etc. from the outside can be avoided, thereby eliminating the need for forming the nut 172 with a coarse pitch to provide resistance to thread stripping. Therefore, the nut 172 can be formed with a fine pitch so that the tightening accuracy can be increased.

Also, the coupling portion 192 is composed of the thread groove formed in the outer peripheral surface of the axle 52, the washer 170, and the nut 172 threaded onto the thread groove. Thus, coupling between the axle 52 and the wheel 90 can be easily performed.

Also, the bearing 194 is inserted between the motor case 44 and the wheel 90, thereby allowing a further increase in stiffness of the drive system.

The portion (the tapered portion 195) of the motor case 44 opposite the coupling portion 192 is tapered so as to deviate from the nut 172. Thus, the motor case 44 (the motor 16 in the motor case 44) can be brought close to the wheel 90, so that the motor case 44 can be further compactly stored in the wheel 90.

Also, in the case of the nut 172 of the right-hand thread type, even if the nut 172 comes loose during travel of the two-wheeled electric vehicle 10, the contact between the tapered portion and the nut 172 allows the nut 172 to be automatically tightened by the travel of the two-wheeled electric vehicle 10 because the rear wheel WR rotates in a direction to tighten the nut 172.

Also, the bearing 254 is inserted between the reduction mechanism case 48 and the wheel 90, thereby allowing a still further increase in stiffness of the drive system.

Further, the labyrinth structure 252 is formed between the reduction mechanism case 48 and the wheel 90 in a manner surrounding the bearing 254. Thus, intrusion of dust, etc. from the outside can be avoided. Also, the drum brake 260 is provided in the hollow portion between the labyrinth structure 252 and the bearing 254, thereby enabling efficient braking of rotation of the wheel 90 while eliminating external environmental influences.

Also, if the bearings 198 and 200 are inserted between the motor case 44 and the motor shaft 16a and all bearings 194, 198, 200, and 254 are seal bearings, intrusion of dust, etc. from the outside is effectively avoided, thereby allowing reliable protection of the coupling portion 192 or the drum brake 260 from disturbance, and easy and efficient sealing between the wheel 90 and each of the motor module 46 and the reduction mechanism module 50.

Also, the oil seal 232 is inserted between the right end of the axle 52 and the motor shaft 16a, thereby reducing the difference between the rotational speed of the motor shaft 16a and the rotational speed of the axle 52 reduced by the reduction mechanism 160 and allowing an increase in durability.

Next, modifications of this embodiment will be described with reference to FIGS. 8 to 13.

Figure 8:
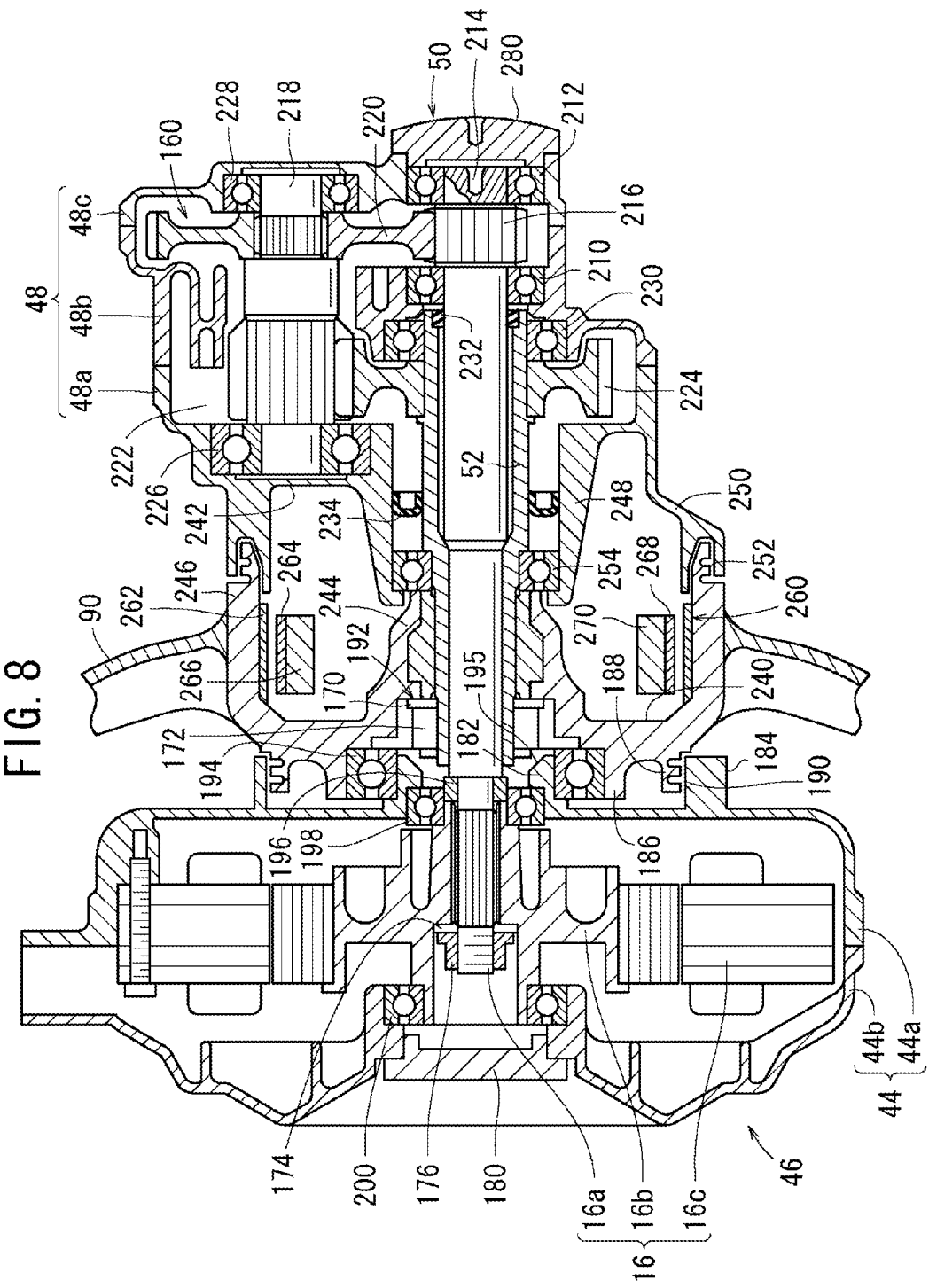
FIG. 8 is a sectional view illustrating an alternative construction of the reduction mechanism module of FIG. 7.

FIG. 8 illustrates a case where a hole portion 214 allowing insertion of a screw-driver or a hex wrench is formed in a right end of the motor shaft 16a, and a cap 280 is attached to a portion of the lid portion 48c opposite the hole portion 214.

In this modification, at the time of tightening the nut 172 by an operator, the operator removes the cap 280 to insert the screw-driver or the hex wrench into the hole portion 214. On the other hand, the operator fixes the nut 172 with a wrench, and in this state, rotates the motor shaft 16a by using the screw-driver or the hex wrench. Then small rotational force of the motor shaft 16a generated by the screw-driver or the hex wrench is transmitted to the axle 52 through the gear portion 216, the gear 220, the reduction shaft 218, the gear portion 222, and the gear 224, thereby generating large tightening force in the coupling portion 192. Consequently, the nut 172 can be easily tightened against the wheel 90 with the large tightening force.

In this manner, in the modification of FIG. 8, the hole portion 214 is formed in the right end of the motor shaft 16a. Thus, rotational force is transmitted to the axle 52 through the reduction mechanism 160 by rotating the hole portion 214 with a screw-driver or a hex wrench while fixing the nut 172. Consequently, large tightening force can be generated in the coupling portion 192 by small rotational force.

Figure 9:
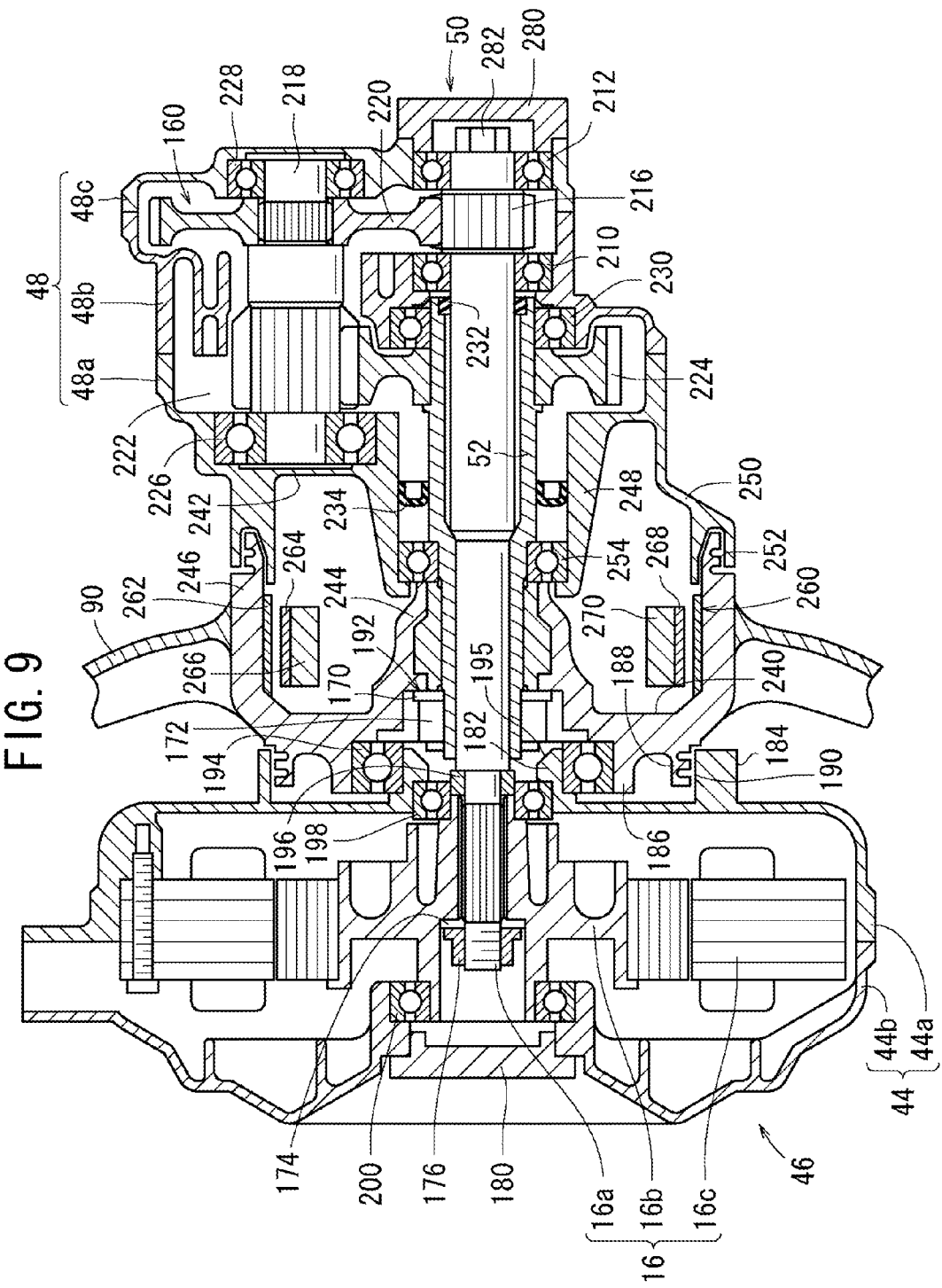
FIG. 9 is a sectional view illustrating an alternative construction of the reduction mechanism module of FIG. 7.

FIG. 9 illustrates a case where the cap 280 is attached to the lid portion 48c, while a bolt head 282 is provided on a right end of the motor shaft 16a. Also in this case, rotational force is transmitted to the axle 52 through the reduction mechanism 160 by fixing the nut 172 with one wrench and, with the cap 280 removed, rotating the bolt head 282 with the other wrench. Thus, large tightening force can be generated in the coupling portion 192 by small rotational force. Consequently, the nut 172 can be easily tightened against the wheel 90 with the large tightening force.

Figure 10:
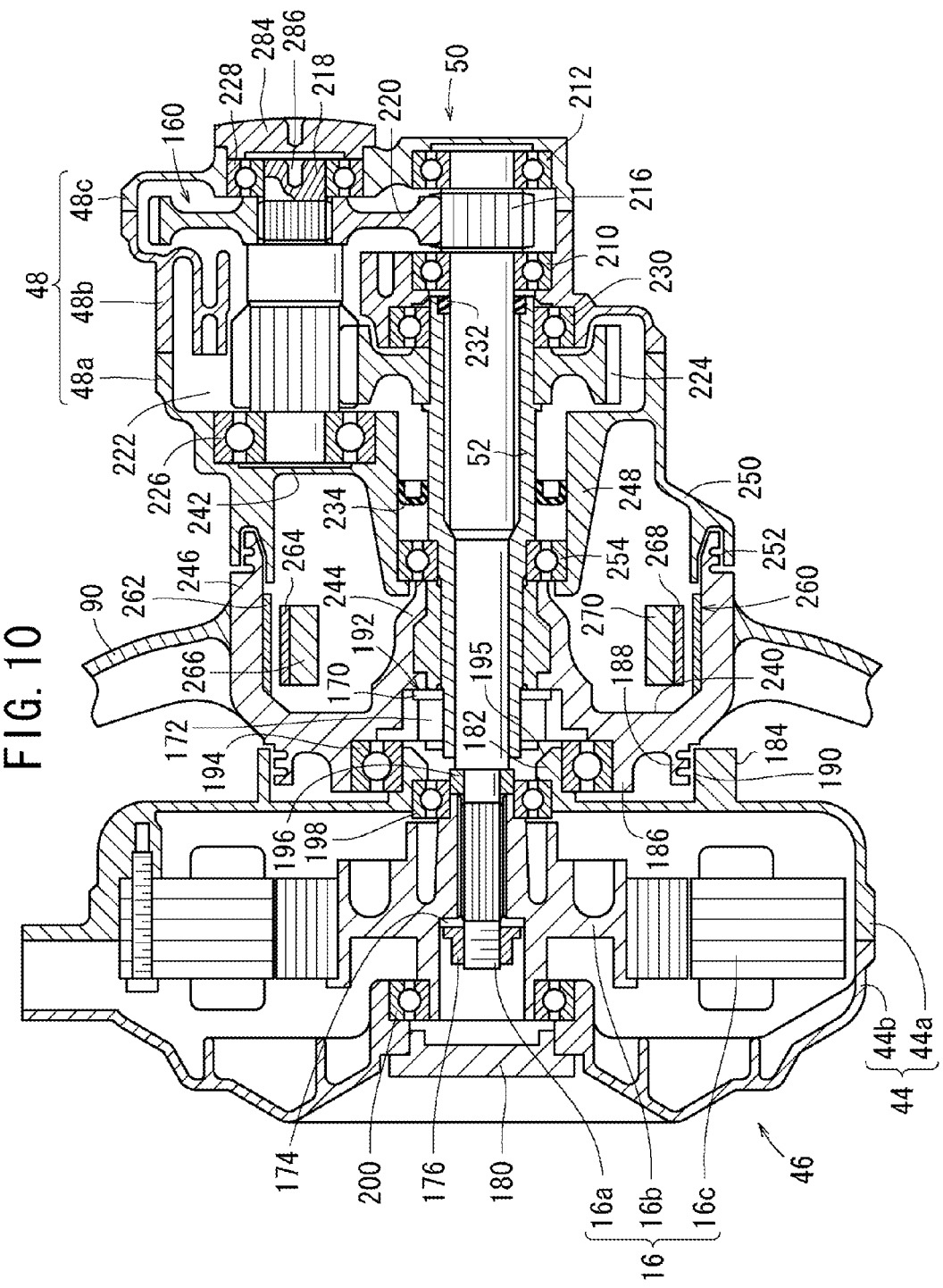
FIG. 10 is a sectional view illustrating an alternative construction of the reduction mechanism module of FIG. 7.

FIG. 10 illustrates a case where a cap 284 is attached to the lid portion 48c, while a hole portion 286 allowing insertion of a screw-driver or a hex wrench is provided at a right end of the reduction shaft 218. Also in this case, large tightening force, which, although not as large as those of the structures of FIGS. 8 and 9, is to some extent larger relative to small rotational force generated in the hole portion 286, can be generated in the coupling portion 192 by fixing the nut 172 with a wrench, and, with the cap 284 removed, inserting a screw-driver or a hex wrench into the hole portion 286 and rotating the reduction shaft 218. Consequently, the nut 172 can be tightened against the wheel 90.

Figure 11:
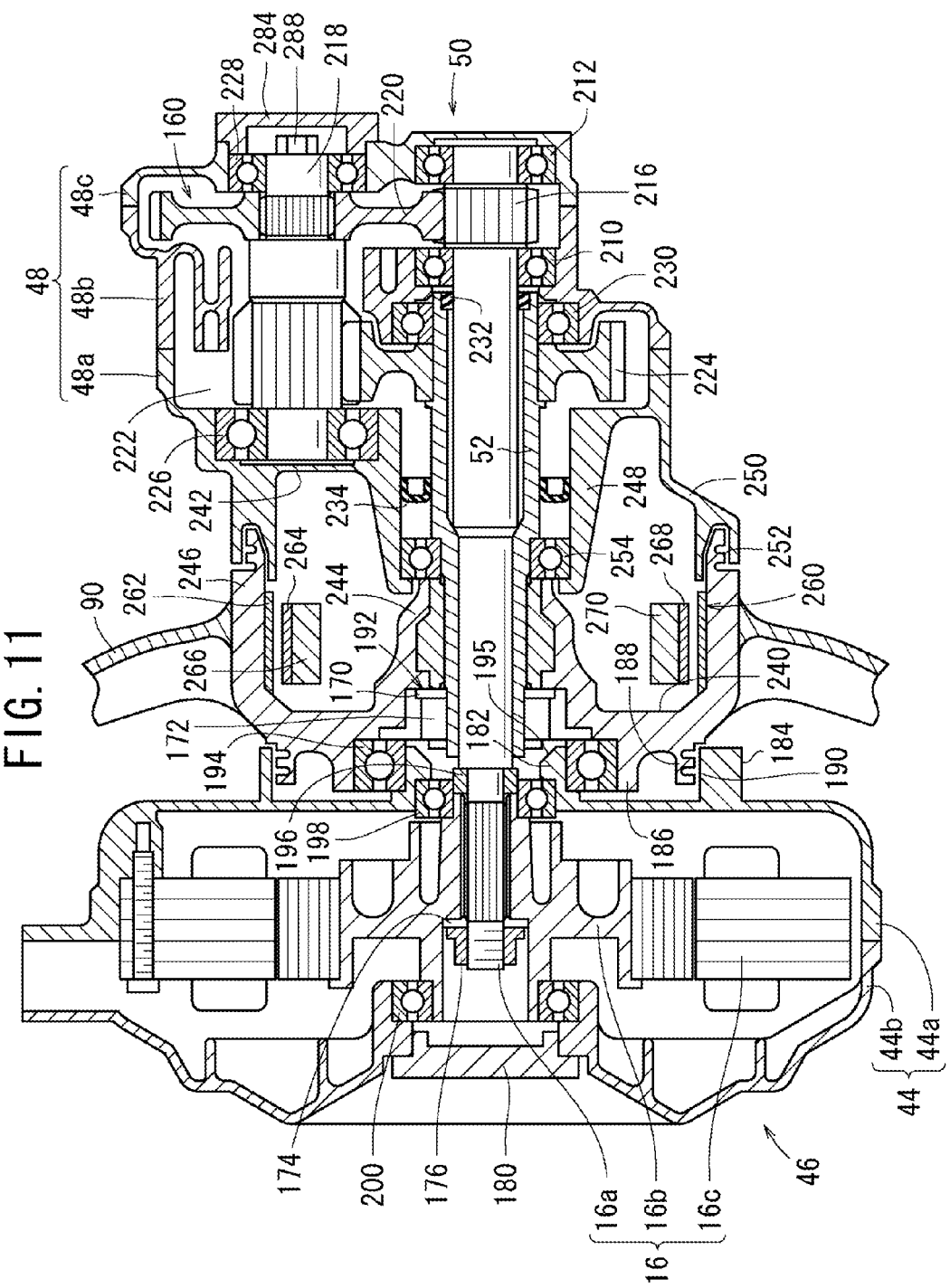
FIG. 11 is a sectional view illustrating an alternative construction of the reduction mechanism module of FIG. 7.

FIG. 11 illustrates a case where the cap 284 is attached to the lid portion 48c, while a bolt head 288 is provided on a right end of the reduction shaft 218. Also in this case, large tightening force, which is to some extent larger relative to small rotational force generated in the bolt head 288, can be generated in the coupling portion 192, in the same manner as the case of FIG. 10, by fixing the nut 172 with one wrench and, with the cap 284 removed, rotating the bolt head 288 using the other wrench. Consequently, the nut 172 can be tightened against the wheel 90.

Figure 12:
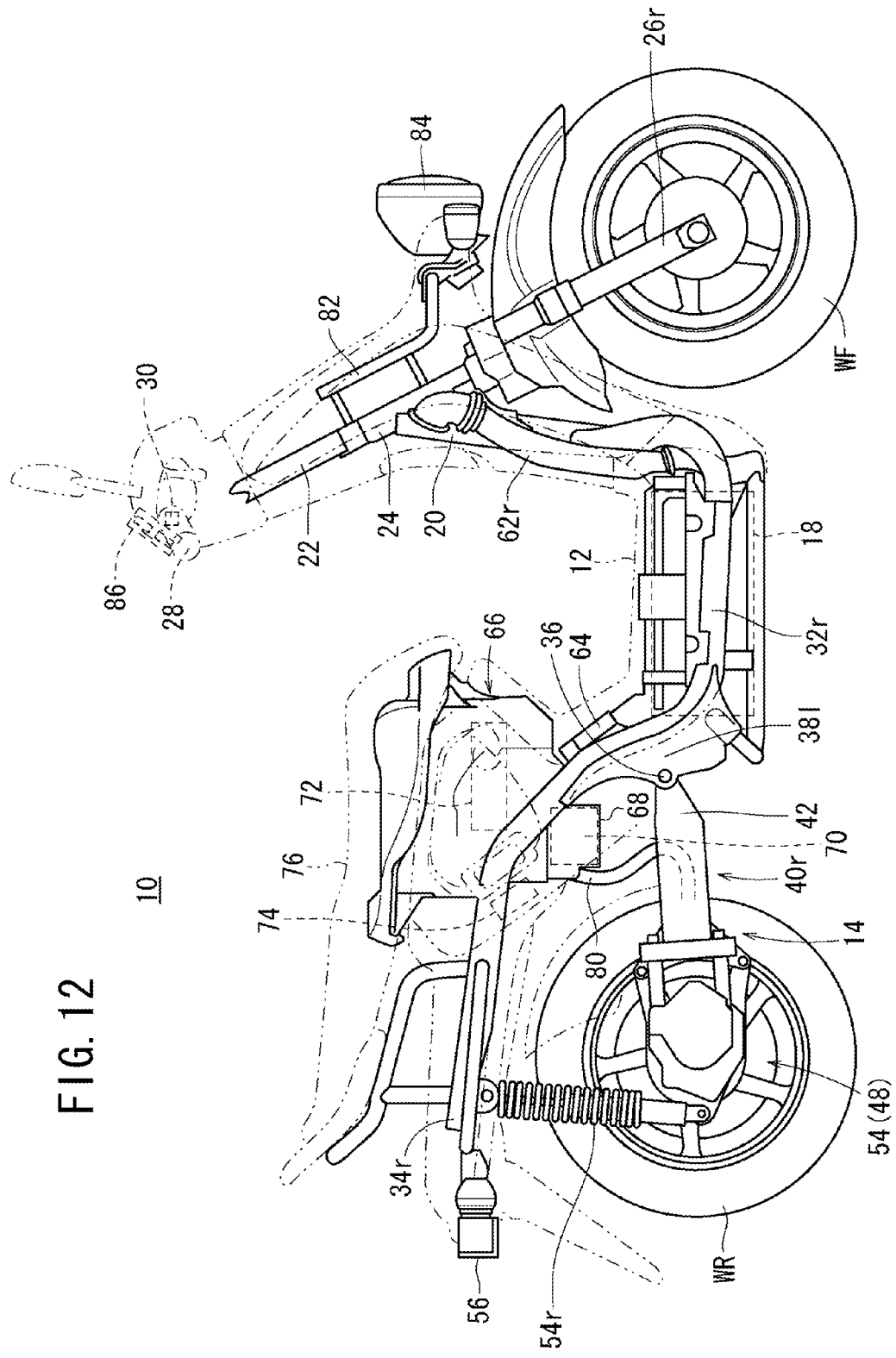
FIG. 12 is a right side view of the two-wheeled electric vehicle, illustrating an alternative construction in terms of coupling between the swing arm and the reduction mechanism module.

FIGS. 12 and 13 illustrate a case where four arm portions 290 extend forward from the first storage portion 48a; a plane rear end 292 is formed at a leading end of the plate-like portion 162, opposite to the arm portions 290; and plural bolts 294 are inserted into bores, not shown, longitudinally formed in the rear end 292, and threaded into threaded holes, not shown, of the arm portions 290, thereby longitudinally coupling the plate-like portion 162 and the respective arm portions 290 with the four bolts 294. This coupling in the longitudinal direction in which the two-wheeled electric vehicle 10 travels allows the realization of coupling capable of resisting shear force (force applied in the longitudinal direction).

Although the present invention has been described by using the preferred embodiment, the technical scope of the present invention is not limited to the scope described in the foregoing embodiment. It is obvious to those skilled in the art that the foregoing embodiment may be variously altered or improved. It will be apparent from the description of the appended claims that a form obtained by altering or improving the embodiment can also be included in the technical scope of the present invention. In addition, it should be understood that the inclusion of reference signs in parentheses in the claims corresponding to the reference signs in the accompanying drawings is intended to facilitate understanding of the present invention. Therefore, the elements designated by the reference signs shall not be construed as limiting the present invention.

What is claimed is:

1. An electric vehicle in which an output of a motor is transmitted to an axle through a reduction mechanism in order to rotate a wheel, wherein:
   the axle, which is slidably fitted to the wheel, passes through the wheel, and is substantially coaxially connected to the wheel for common rotation therewith, is a hollow cylindrical shaft;

a brake for braking rotation of the wheel;

the motor has a motor shaft inserted into and through the hollow cylindrical shaft substantially coaxially with the cylindrical shaft so as to extend from first and second ends of the hollow cylindrical shaft;

wherein, on a first side of the wheel, the motor is connected to a base end of the motor shaft extending from the first end of the hollow cylindrical shaft;

on a second side of the wheel, the reduction mechanism is connected to a leading end of the motor shaft that projects from the second end of the hollow cylindrical shaft; and the reduction mechanism rotates the hollow cylindrical shaft and the wheel in accordance with rotation of the motor shaft caused by driving of the motor;

wherein the brake is disposed on the second side of the wheel, surrounds the axle and the motor shaft, and is disposed relatively between the wheel and the reduction mechanism.

2. The electric vehicle according to claim 1, further comprising a double-sided swing arm for supporting the motor shaft, the cylindrical shaft, and the wheel by supporting the motor on the first side of the wheel and the reduction mechanism on the second side of the wheel.

3. The electric vehicle according to claim 2, further comprising:

a motor module composed of the motor and a motor case for storing the motor, the motor module being removable from the swing arm and the wheel; and a reduction mechanism module composed of the reduction mechanism and a reduction mechanism case for storing the reduction mechanism, the reduction mechanism module being removable from the swing arm and the wheel.

4. The electric vehicle according to claim 3, wherein:

the motor module is relatively rotatably mounted to the wheel through a first bearing; and the reduction mechanism module is relatively rotatably mounted to the wheel through a second bearing.

5. The electric vehicle according to claim 4, wherein the motor module and the reduction mechanism module are mounted with suspensions.

6. The electric vehicle according to claim 4, wherein:

the motor is provided with a rotor substantially coaxially mounted to the base end of the motor shaft for rotating the motor shaft; and the leading end of the motor shaft is supported by third bearings.

7. The electric vehicle according to claim 4, wherein the reduction mechanism is provided with:

a first gear formed at the leading end of the motor shaft;

a second gear disposed forwardly of the motor shaft, the second gear engaging with the first gear;

a reduction shaft disposed forwardly of and substantially parallel to the cylindrical shaft and the motor shaft, and substantially coaxially connected to the second gear;

a third gear formed on the reduction shaft on the second side of the wheel; and a fourth gear substantially coaxially connected to the cylindrical shaft on the second side of the wheel, the fourth gear engaging with the third gear.

8. The electric vehicle according to claim 3, wherein the motor module and the reduction mechanism module are mounted with suspensions.

9. The electric vehicle according to claim 8, wherein:

the motor is provided with a rotor substantially coaxially mounted to the base end of the motor shaft for rotating the motor shaft; and the leading end of the motor shaft is supported by third bearings.

10. The electric vehicle according to claim 8, wherein the reduction mechanism is provided with:

a first gear formed at the leading end of the motor shaft;

a second gear disposed forwardly of the motor shaft, the second gear engaging with the first gear;

a reduction shaft disposed forwardly of and substantially parallel to the cylindrical shaft and the motor shaft, and substantially coaxially connected to the second gear;

a third gear formed on the reduction shaft on the second side of the wheel; and a fourth gear substantially coaxially connected to the cylindrical shaft on the second side of the wheel, the fourth gear engaging with the third gear.

11. The electric vehicle according to claim 3, wherein:

the motor is provided with a rotor substantially coaxially mounted to the base end of the motor shaft for rotating the motor shaft; and the leading end of the motor shaft is supported by third bearings.

12. The electric vehicle according to claim 3, wherein the reduction mechanism is provided with:

a first gear formed at the leading end of the motor shaft;

a second gear disposed forwardly of the motor shaft, the second gear engaging with the first gear;

a reduction shaft disposed forwardly of and substantially parallel to the cylindrical shaft and the motor shaft, and substantially coaxially connected to the second gear;

a third gear formed on the reduction shaft on the second side of the wheel; and a fourth gear substantially coaxially connected to the cylindrical shaft on the second side of the wheel, the fourth gear engaging with the third gear.

13. The electric vehicle according to claim 2, wherein:

the motor is provided with a rotor substantially coaxially mounted to the base end of the motor shaft for rotating the motor shaft; and the leading end of the motor shaft is supported by third bearings.

14. The electric vehicle according to claim 2, wherein the reduction mechanism is provided with:

a first gear formed at the leading end of the motor shaft;

a second gear disposed forwardly of the motor shaft, the second gear engaging with the first gear;

a reduction shaft disposed forwardly of and substantially parallel to the cylindrical shaft and the motor shaft, and substantially coaxially connected to the second gear;

a third gear formed on the reduction shaft on the second side of the wheel; and a fourth gear substantially coaxially connected to the cylindrical shaft on the second side of the wheel, the fourth gear engaging with the third gear.

15. The electric vehicle according to claim 1, wherein:

the motor is provided with a rotor substantially coaxially mounted to the base end of the motor shaft for rotating the motor shaft; and the leading end of the motor shaft is supported by third bearings.

16. The electric vehicle according to claim 15, wherein the reduction mechanism is provided with:
- a first gear formed at the leading end of the motor shaft;
- a second gear disposed forwardly of the motor shaft, the second gear engaging with the first gear;
- a reduction shaft disposed forwardly of and substantially parallel to the cylindrical shaft and the motor shaft, and substantially coaxially connected to the second gear;
- a third gear formed on the reduction shaft on the second side of the wheel; and
- a fourth gear substantially coaxially connected to the cylindrical shaft on the second side of the wheel, the fourth gear engaging with the third gear.

17. The electric vehicle according to claim 1, wherein the reduction mechanism is provided with:
- a first gear formed at the leading end of the motor shaft;
- a second gear disposed forwardly of the motor shaft, the second gear engaging with the first gear;
- a reduction shaft disposed forwardly of and substantially parallel to the cylindrical shaft and the motor shaft, and substantially coaxially connected to the second gear;
- a third gear formed on the reduction shaft on the second side of the wheel; and
- a fourth gear substantially coaxially connected to the cylindrical shaft on the second side of the wheel, the fourth gear engaging with the third gear.

* * * * *